United States Patent [19]
Kim et al.

[11] Patent Number: 6,025,698
[45] Date of Patent: Feb. 15, 2000

[54] SMART BATTERY CHARGING SYSTEM, CHARGING METHOD THEREFOR AND POWER SUPPLY SYSTEM FOR PORTABLE COMPUTER USING THE SAME

[75] Inventors: Hyo Jin Kim, Sungnam; Jong Gook Hong, Seoul, both of Rep. of Korea

[73] Assignee: Daewoo Telecom Ltd., Incheon, Rep. of Korea

[21] Appl. No.: 09/138,501

[22] Filed: Aug. 24, 1998

[30] Foreign Application Priority Data

Aug. 25, 1997 [KR] Rep. of Korea ............... 97-40468

[51] Int. Cl.[7] ................ H01M 10/44; H01M 10/46
[52] U.S. Cl. .................. 320/132; 320/150; 320/152; 320/160
[58] Field of Search .................. 320/106, 107, 320/110, 112, 132, 131, 134, 136, 150, 151, 152, 160

[56] References Cited

U.S. PATENT DOCUMENTS 4,553,081 11/1985 Koenck ........................ 320/131
4,709,202 11/1987 Koenck et al. ................ 320/112

*Primary Examiner*—Edward H. Tso
*Attorney, Agent, or Firm*—Bruce E. Lilling

[57] ABSTRACT

The present invention relates to a smart battery charging system, a charging method therefor and a power supply system for portable computer using the same that executes various charging operations securely corresponding to types of the smart batteries connected to the notebook computer. A smart battery charger 60 supplies charging voltage and charging current to the smart battery 70 selectively by controlling data input through an SM bus. The smart battery charger 60 and the smart battery 70 are connected to a keyboard controller 80 through the SM bus. The keyboard controller 80 determines the power on-off status of the notebook computer, based on second power voltage outputted from an SMPS 130, and identifies the types of the smart batteries, based on battery identifying signals outputted from the smart battery charger 60. The system controls the smart battery charger 60 appropriately based on the above detecting results and status data of the smart battery 70, thus charging the smart battery 70 stably and optimally. A constant voltage regulating circuit 150 supplies operational powers to the keyboard controller 80, regardless of the power on-off and external power source.

23 Claims, 25 Drawing Sheets

12.3V CONSTANT VOLTAGE CHARGING CHARATERISTIC
OF Li-Ion SMART BATTERY

1800mA CONSTANT CURRENT CHARGING CHARACTERISTIC
OF Ni-MH SMART BATTERT

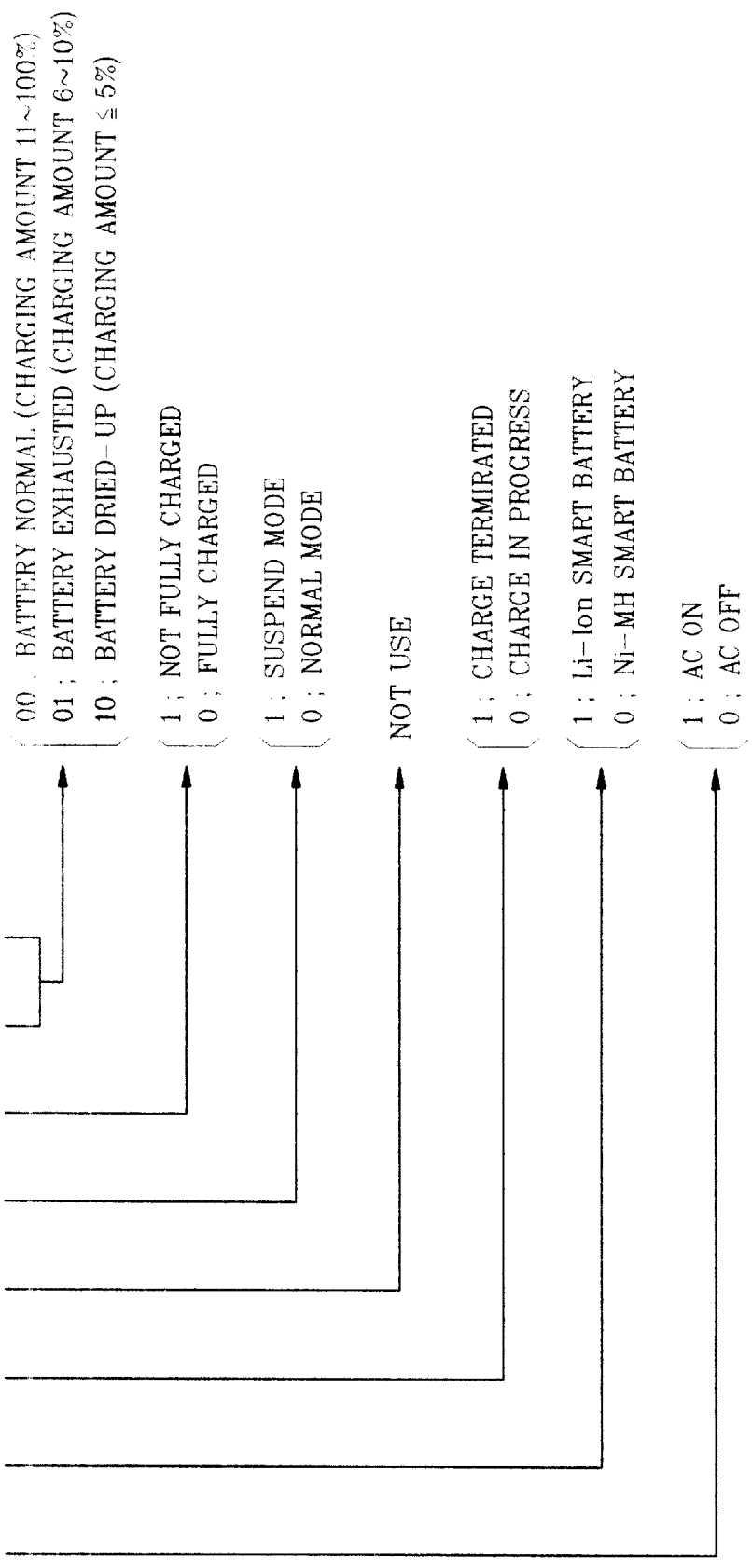

SMART BATTERY CHARGING SYSTEM, CHARGING METHOD THEREFOR AND POWER SUPPLY SYSTEM FOR PORTABLE COMPUTER USING THE SAME

BACKGROUND OF THE INVENTION

1. Field of the Invention

The present invention relates to a smart battery charging system applied to portable computers, such as notebook computers, and more particularly relates to a smart battery charging system, a charging method therefor and a power supply system for portable computer using the same that executes various charging operations securely corresponding to the type of the smart batteries connected to the notebook computer.

2. Discussion of Prior Art

Recently, portable computers of compact size, such as laptop or notebook computers, have become popular and are in widespread usage in many countries. Typically, these portable computers utilize various battery powers when an external power is not convenient or is not available. At present, lithium ion (Li-ion) and nickel-metal hydride (Ni-MH) batteries have been known to be used in applications for such portable computers. However, since these batteries may burst when over charged, etc., careful attention is necessarily required in designing the concerned charging circuitry. Accordingly, smart batteries, providing their status data, such as charging status, temperature status, etc., to a smart battery charging system for stable and secure charging operations, are in widespread usage as a battery power when an external power is not convenient or is not available.

FIG. 1 shows a port pattern of a general smart battery, comprised of a positive port (+), a resistance sensing port T, a SM bus data port D, a System Management (hereinafter SM) bus clock port C and a negative port (−), that outputs various data, such as over charged alarm, charge terminated alarm, over temperature alarm, fully charged alarm and fully discharged alarm through the SM bus data port T and SM bus clock port C. In particular, the resistance sensing port T is connected to a ground, either through a resistor having a value of 500 Ω in case of the Li-ion battery, or through a temperature sensor of negative thermal condition NTC type having values of approximately 10 kΩ to 2.5 kΩ according to the battery temperature status in case of the Ni-MH battery.

Meanwhile, there are several problems in constructing a smart battery charger for the smart battery described above.

First, in general, there are two types of the smart batteries, Li-ion battery and Ni-MH battery, the former needs a constant voltage charge and the later needs a constant current charge. FIG. 2a is a characteristic curve showing a charging characteristic of the Li-ion smart battery. When constant voltage of 12.30V (12.45V maximum) is applied to the positive port (+) of the Li-ion smart battery during a predetermined time t1, the charging voltage increases gradually and then the Li-ion smart battery is fully charged. FIG. 2b is a characteristic curve showing a charging characteristic of the Ni-MH smart battery. When constant current of 1800 mA maximum is applied to the positive port (+) of the Ni-MH smart battery during a predetermined time t2, the charging voltage is increased gradually to 12.30V, in this manner, the Ni-MH smart battery is fully charged. In particular, when the charging current is supplied to the Ni-MH smart battery continuously after the battery is fully charged at a point of t2, the charging voltage starts to be decreased on the contrary. Therefore, it needs to shut off the charging current when the smart battery is fully charged.

Meanwhile, it is expected that the user of a notebook computer may not be aware of the different characteristics of the two smart batteries applied to the notebook computer and make the Li-ion smart battery supplied with a higher charging voltage than a regular charging voltage or make the Ni-MH smart battery charged by a higher charging current than a regular charging current. This may cause explosion of the corresponding smart battery.

Therefore, when applying the above described smart batteries to the notebook computer, it is necessary to execute an appropriate charging operation by identifying the types of the smart batteries being connected, and to arrange circuitry for controlling the charging voltage and the charging current simultaneously against the smart battery.

Second, as described above, while an allowable error limit for the charging voltage of the Li-ion smart battery is within 12.3V+/−1%, if over-voltage, exceeding the allowable error limit, is supplied to the Li-ion smart battery as a charging voltage, the Li-ion smart battery may burst. So, it is indispensable to control the charging voltage for the Li-ion smart battery precisely.

Third, the smart battery charging circuitry reads out the smart battery status through the SM bus and executes charging control operations according to the result. Meanwhile, in case that the SM bus doesn't operate due to a short, etc., and the smart battery is over charged accordingly, the smart battery may burst. So, it is necessary to provide a safety device for preventing the smart battery from being over charged securely.

And, in case that the smart battery described above is applied to the notebook computer, when the user turns off the notebook computer, leaving the notebook computer being connected to an external power source, and if the charging control circuitry of the smart battery is set to a non-operational status, the charging operations will be continuously executed, regardless of the charge status of the smart battery. This may also cause explosion of the smart battery. So it is necessary to keep the charging control circuitry of the smart battery in an operational status constantly, regardless of the power on-off status of the notebook computer.

SUMMARY OF INVENTION

Accordingly, it is an object of the present invention to provide a smart battery charging system that facilitates control of charging voltage and charging current for a smart battery.

It is a further object of the present invention to provide a smart battery charging system that executes charging operations safely by identifying the type of smart battery.

Another object of the invention is to provide a charging method for a Li-ion smart battery that can control the charging voltage for the Li-ion smart battery precisely.

An additional object of the invention is to provide a smart battery charging system that controls the charging operations of the smart battery securely, regardless of the power on-off status of the notebook computer.

Yet another object of the invention is to provide a power supply system of a portable computer, utilizing a smart battery as an auxiliary power supply, for ensuring stable operations of the portable computer.

A smart battery charger, according to a first aspect of the present invention, for supplies predetermined charging power to a smart battery that includes a positive port (+), a resistance sensing port T, a SM bus data port D, a System Management (hereinafter SM) bus clock port C and a negative port (−), and outputs various data, such as over charged alarm, charge terminated alarm, over temperature alarm, fully charged alarm and fully discharged alarm through the SM bus data port T and SM bus clock port C. The charger includes a switching mode power supply (SMPS) for generating predetermined operational power based on a first predetermined power voltage and keeping a power voltage, inputted from a feedback port established therein, constant. A current detecting means receives the operational power outputted from the SMPS and outputs current corresponding to a current amount outputted through a predetermined detected current output port provided therein. A digital-to-analog converting means is connected to the SM bus, including first and second voltage output ports for outputting first and second power signals corresponding to data inputted through the SM bus. Here, the output current of the current detecting means is coupled to a charging power output port. First and second resistors are serially connected between the charging power output port and a ground, and nodes, formed therebetween, are linked to the feedback port of the SMPS through a line. The first voltage output port of the digital-to-analog converting means is connected to the line through a third resistor. The detected current output port of the current detecting means is coupled to the line through a first diode and to the second voltage output port of the digital-to-analog converting means through a second diode and a fourth resistor.

A charge signal generator, according to a second aspect of the present invention, supplies a predetermined charging power to a smart battery that includes a positive port (+), a resistance sensing port T, a SM bus data port D, a SM bus clock port C and a negative port (−), and outputs various data, such as over charged alarm, charge terminated alarm, over temperature alarm, fully charged alarm and fully discharged alarm through the SM bus data port T and SM bus clock port C. A first resistor is connected between the resistance sensing port and a first power voltage. A first comparing means includes a non-inverting terminal is connected to a voltage level of the resistance sensing port and an inverting terminal connected to a first predetermined reference voltage. A second comparing means includes a non-inverting terminal connected to a voltage level of the resistance sensing port, an inverting terminal connected to a second predetermined reference voltage and an output terminal connected to the inverting terminal of the first comparing means. The output signals of the first comparing means are outputted as charge signals.

A smart battery charging system, according to a third aspect of the present invention, supplies a predetermined charging power to a smart battery that includes a positive port (+), a resistance sensing port T, a SM bus data port D, a SM bus clock port C and a negative port (−), and outputs various data, such as over charged alarm, charge terminated alarm, over temperature alarm, fully charged alarm and fully discharged alarm through the SM bus data port T and SM bus clock port C. A battery charging means, including a charging power output port connected to the positive port of the smart battery, varies voltage level and current level of charging power, ouputted through the charging power output port, based on data inputted through the SM bus. A charge signal generating means, connected to the resistance sensing port of the smart battery, for generates predetermined charge signals and battery identifying signals, based on resistance values of the smart batteries connected to the resistance sensing port. A keyboard controller is connected to the charge means and the smart battery through the SM bus, for controlling the battery charging means by identifying the types of smart batteries based on the battery identifying signals obtained from the charge signal generating means. The battery charging means executes the battery charging operation based on the charge signals obtained from the charge signal generating means.

A charging method, according to a fourth aspect of the present invention, charges the Li-ion smart battery that includes a positive port (+), a resistance sensing port T, a SM bus data port D, a SM bus clock port C and a negative port (−), and outputs various data, such as over charged alarm, charge terminated alarm, over temperature alarm, fully charged alarm and fully discharged alarm through SM bus data port T and SM bus clock port C. The method includes a battery charging step of supplying the smart battery with a first charging power having first voltage value and a first current value; a current value reading step of reading the current value of the smart battery; and a charging voltage control step of boosting the charging voltage in stages to the maximum voltage that the smart battery allows, in case the battery current value read from the current value reading step is less than second current value. Here, the second current value is set to be less than the first current value.

A power supply system for a notebook computer, according to a fifth aspect of the present invention, includs a smart battery that has a positive port (+), a resistance sensing port T, a SM bus data port D, a SM bus clock port C and a negative port (−), and outputs various data, such as over charged alarm, charge terminated alarm, over temperature alarm, fully charged alarm and fully discharged alarm through SM bus data port T and SM bus clock port C. The notebook computer charges the smart battery when an external power source is connected thereinto, and utilizes the charging power of the smart battery as an operational power when no external power source is connected thereinto. A power input means is connected to the external power source and a positive port of the smart battery, for outputting external power or smart battery power selectively based on the connection status of the external power source and outputting the external power as a first power voltage. A power on-off signal input means through which a user turns on and off the notebook computer. A SMPS for outputting a second power voltage for operating the notebook computer based on the operational power obtained from the power input means when the notebook computer is turned on, and outputting a first level of power good signal when power is on and a second level of power good signal when power is off. A constant voltage regulating means generates a third power, based on the second power voltage when the power good signal is the first level, and based on the first power voltage when the power good signal is the second level. A battery charging means, utilizes the first power voltage as an operational power and includes a charging power output port connected to the positive port of the smart battery, for varying voltage level and current level of the charging power, ouputted through the charging power output port, according to data inputted through an SM bus. A keyboard controller, utilizes the third power voltage as an operational power and connects to the battery caring means and the smart battery through the SM bus, for controlling the smart battery charging means by identifying the type of smart battery based on battery identifying signals obtained from a charge signal generating means.

According to the present invention constructed as above, it is possible to control the charging voltage and the charging current supplied to the smart battery, selectively, based on the first and second power voltages outputted from the analog-to-digital converter. And, the first and second power voltages outputted from the analog-to-digital converter can be controlled through the SM bus. Accordingly, it is possible to execute appropriate charging operations according to the types of smart batteries.

Besides, according to the present invention, since software methods provided in the system can compensate for the hardware errors of the smart battery charger, the charging operations for the smart battery can be executed precisely, which facilitates the design of the hardware as well.

Furthermore, according to the present invention, it is possible to sense the over charged status of the smart battery, based on voltage levels of the resistance sensing port provided in the smart battery. With these signals, the system shuts down the charging operations of the smart battery directly, thus enhancing the safety in charging operations of the smart battery.

Moreover, the power supply system, in accordance with the present invention, sets the charging power for the smart battery appropriately according, to the on-off status of the notebook computer, and outputs a save-to-disk signal STD based on the charge amount of the smart battery and the connection status of the external power, thus enhancing the security in operations of the notebook computer.

In addition, since operational power is supplied constantly to the keyboard controller for controlling the i5 smart battery charging system, regardless of the on-off status of notebook computer, it is possible to execute the charging operations for the smart battery securely.

It is to be understood that both the foregoing general description and the following detailed description are exemplary and explanatory and are intended to provide further explanation of the invention as claimed.

BRIEF DESCRIPTION OF DRAWINGS

These and other objects of the present invention will be readily understood with reference to the specification and accompanying drawing, wherein:

FIG. 10 illustrates a configuration of bits of battery flag register provided in a keyboard controller in the power supply system of FIG. 8.

BEST MODE FOR CARRYING OUT THE INVENTION

Reference will now be made in detail to the preferred embodiments of the present invention, examples of which are illustrated in the accompanying drawings.

Figure 3:
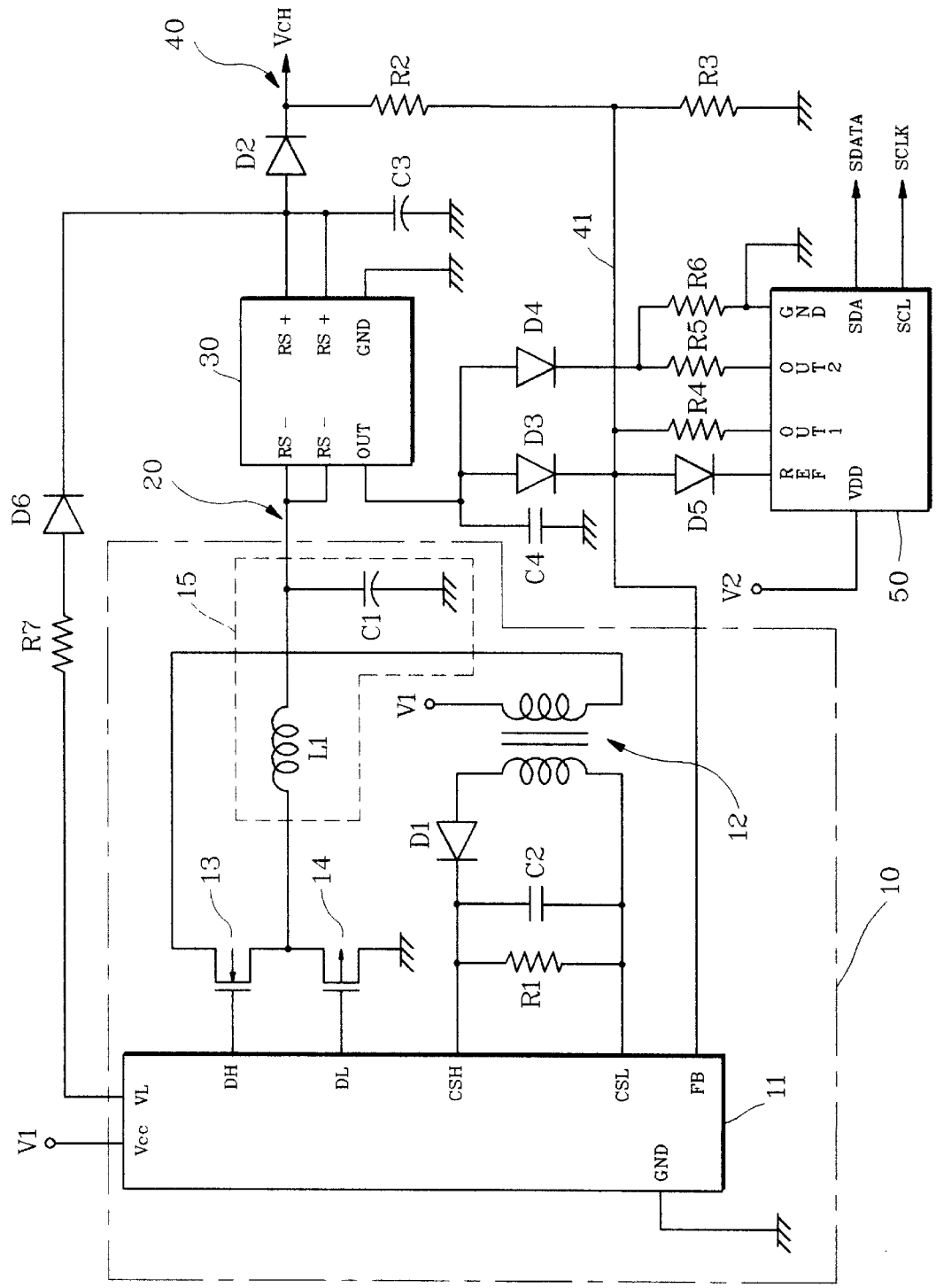
FIG. 3 is a circuit diagram of a smart battery charger in accordance with an embodiment of the present invention.

Referring to FIG. 3, a circuit diagram of a smart battery charger, in accordance with an embodiment of the present invention is shown. A switching mode power supply (hereinafter SMPS) 10 generates operational power, supplied to a charging circuit, based on a first predetermined power V1, for example input power of 18V. The SMPS 10 includes a pulse width modulation PWM controller 11 for controlling the SMPS 10 using pulse width modulated signals so that feedback voltage supplied to a feedback port has a constant value. A transformer 12 and a current passage between the drain-source of an N-channel FET 13 and a P-channel FET 14 are connected in series between the first power V1 and a ground. Nodes of the N-channel FET 13 and P-channel FET 14 are coupled to a power output port 20 through a rectifier circuit 15 comprising an inductor L1 and a condenser C1. Here, the transformer 12 detects over-current outputted through the power output port 20. A second coil of the transformer 12 and a diode are coupled to current detect ports CSH and CSL of the PWM controller 11 in series. A bypass condenser C2 is connected to a resistor R1 in parallel between the current detect ports CSH and CSL of the PWM controller 11. Gates of the N-channel FET 13 and the P-channel FET 14 are coupled to driving signal output ports DH and DL of the PWM controller.

The PWM controller 11 first outputs predetermined driving signals to the driving signal output ports DH and DL when the first power V1 is inputted. Here, the driving signals outputted to the driving signal output ports DH and DL have complementary levels with each other, that is, when the driving signal output port DH is "H" (high) level, the driving signal output port DL is set to "L" (low) level, and when the driving signal output port DH is "L" level, the driving signal output port DL is set to "H" level. Thus, the first power V1 is outputted to the power output port 20 through the FET 13 and 14, complementarily connected to the transformer 12, and through the rectifier circuit 15. The outputting power value corresponds to the length of "H" level of the driving signal output port DH.

The PWM controller 11 controls the level of driving signals outputted to the driving output ports DH and DL so that the voltage level inputted to the feedback port FB has a constant value, for example 2.5V. That is, when the feedback voltage is greater than or equal to 2.5V, the PWM controller outputs "L" and "H" levels to the driving signal output ports DH and DL, respectively, and when the feedback voltage is less than 2.5V, it outputs "H" and "L" levels to the driving signal output ports DH and DL, respectively. Besides, when the current difference between the current detect ports CSH and CSL is increased greater than or equal to 10 mV, according as the current amount flowing through the second coil of the transformer 12 is increased, the PWM controller 11 sets the output levels of the driving signal output ports DH and DL to "L" and "H" respectively so as to prevent over-current flowing through a first coil of the transformer 12. Subsequently, it prevents the SMPS 10 from outputting over-current.

Figure 1:
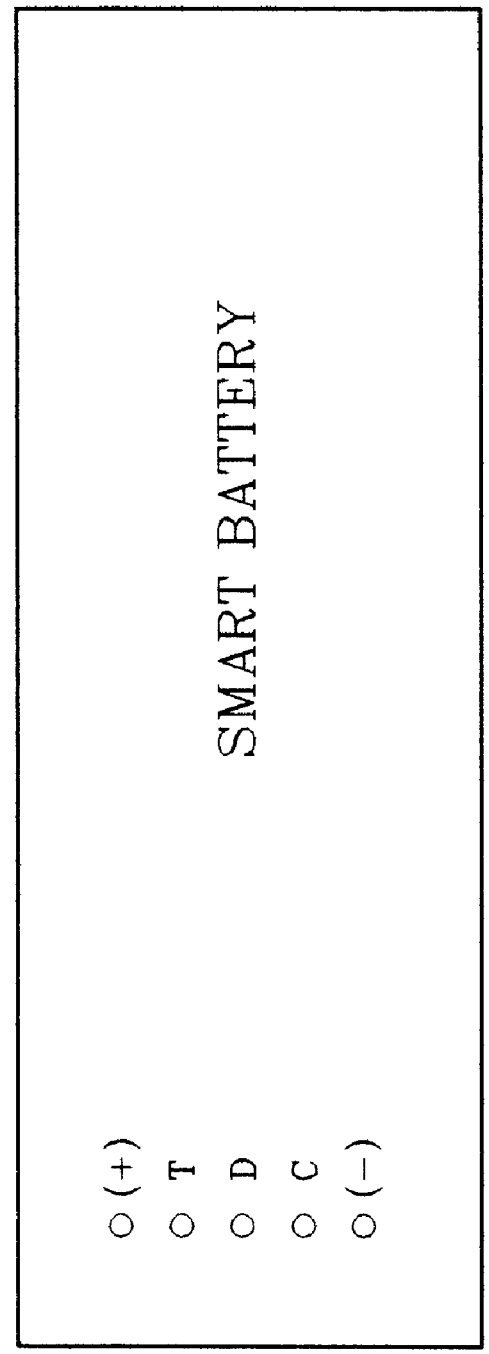
FIG. 1 shows a port pattern of a general smart battery.

Reference numeral 30 denotes a current detector, of which a RS– port is connected to the power output port 20 of the SMPS 10 and a RS+ port is coupled to a charging power output port 40 through a diode D2 for preventing reverse current. The charging power V$_{ch}$ outputted through the charging power output port 40 is connected to the positive port (+) of the smart battery shown in FIG. 1. A predetermined output port OUT for outputting detected current is provided in the current detector 30. The current amount outputted through the output port OUT is inputted to the RS– port and corresponds to the current amount outputted to the RS+ port, on the contrary, the current amount flowing from the RS– port to the RS+ port is set in proportion to the current amount outputted through the output port OUT. That is, the current amount flowing through the current detector 30 is controlled by controlling the current amount outputted through the output port OUT.

Meanwhile, resistors R2 and R3 are connected in series between the charging power output port 40 and a ground, and the nodes, formed therebetween, are coupled to the feedback port FB of the PWM controller 11 through a line 41. The output port OUT of the current detector 30 is connected to the line 41 through a diode D3 for preventing reverse current and is grounded through a bypass condenser C4.

A digital-to-analog converter, shown with the reference numeral 50, outputs analog voltage signals corresponding to input data, in which a reference voltage input port REF is coupled to the line 41 through a diode D5 and a first voltage output port OUT1 is connected to the line 41 through a resistor R4. The output port OUT of the current detector 30 is coupled to a second voltage output port OUT2 of the digital-to-analog converter 50 through a diode D4 for preventing reverse current and a resistor R5, and a node between the diode D4 and the resistor R5 is grounded through a resistor R6. The digital-to-analog converter 50 is linked to a System Management (hereinafter SM) bus, that is, a SM bus data line SDATA and a SM bus clock line SCLK so as to output predetermined voltage levels through the first and second voltage output ports OUT1 and OUT2 according to data inputted through the SM bus. Here, the voltage levels outputted to the first and second voltage output ports OUT1 and OUT2 can be controlled in 256 steps on the basis of the voltage levels applied to the reference voltage input port REF. For example, if a reference voltage is 2.5V, voltage levels outputted to the first and second voltage output ports OUT1 and OUT2 can be set in the unit of 0.01V.

Meanwhile, a voltage output port VL of the PWM controller 11 is coupled to the RS+port of the current detector 30 through a resistor R7 and a diode D6 in order to avoid damage of the current detector 30 due to over-current, by presetting the level of the RS+ port of the current detector 30, for example to 5V, to prevent a sudden flow of the current from the RS– port to the RS+ port.

Figure 4A:
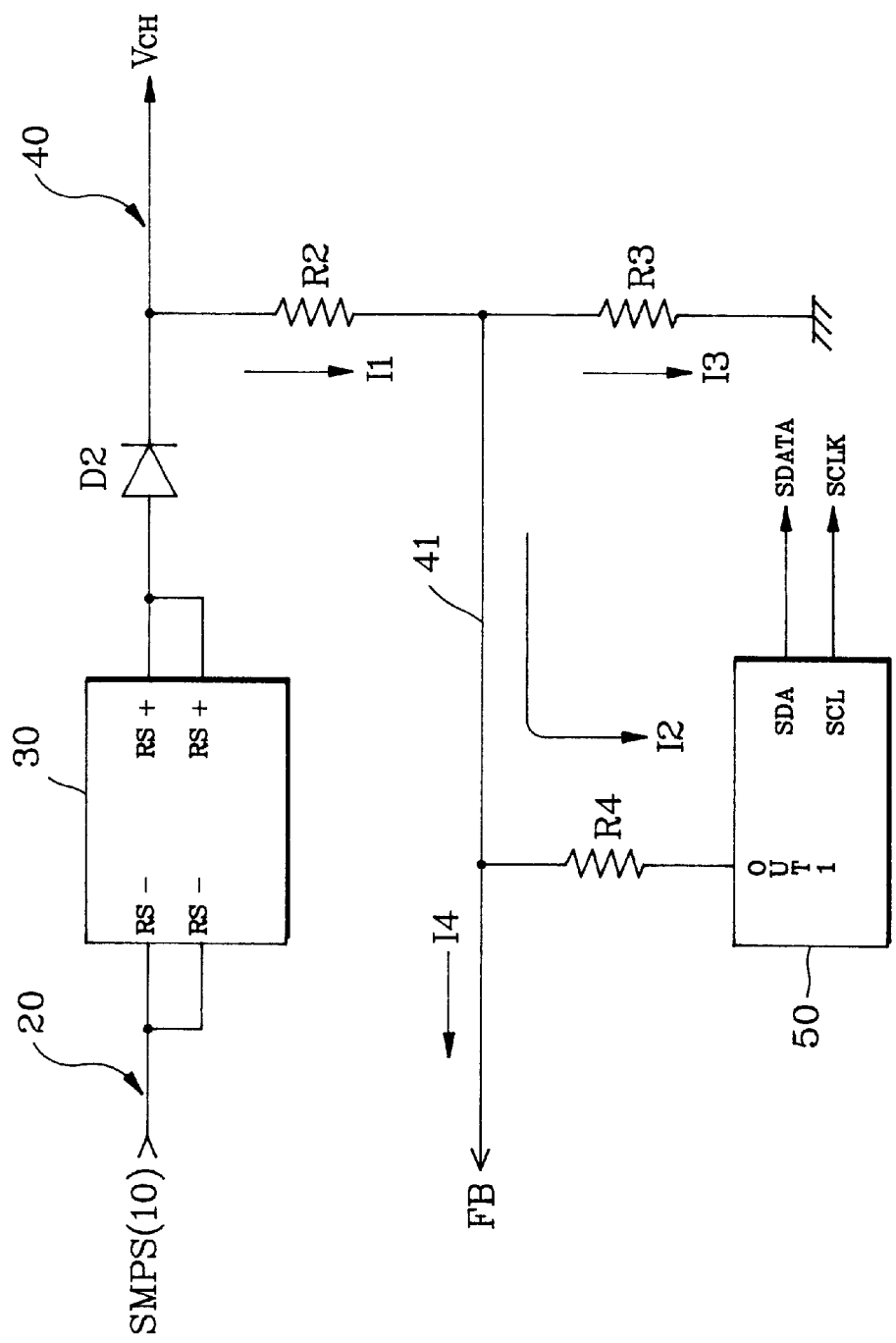
FIG. 4a and FIG. 4b are schematic diagrams for explaining the control operations of the charging voltage and the charging current for the smart battery illustrated in FIG. 3.

With reference to FIG. 4a, the control operations of the charging voltage for the smart battery is discussed hereinafter.

FIG. 4a is a schematic diagrams showing a main part of the smart battery charger illustrated in FIG. 3.

As an input impedance of the feedback port FB of the PWM controller 11 has an infinite value ideally, the current I4 flowing to the feedback port FB is "0". When expressing the current flowing through resistor R3 as I1, the current through resistor R2 as I2 and the current through resistor R4 as I3, they are expressed as a following formula.

[Formula 1]

$$I1 = I2 + I3$$

When expressing the voltage of the line 41, that is, the feedback voltage of the PWM controller as V$_{FB}$, the output voltage of the first voltage ouput port OUT1 of the digital-to-analog converter 50 as V$_{OUT1}$ and the voltage of the charging power V$_{ch}$ supplied to the smart battery, that is, the voltage of the charging power output port 40 as V$_{OUT2}$, they are newly expressed as

[Formula 2]

$$I1 = \frac{V_{OUT}V_{FB}}{R2}, \quad I2 = \frac{V_{FB} - V_{OUT1}}{R4}, \quad \text{and } I3 = \frac{V_{FB}}{R3}$$

Accordingly, when substituting the formula 2 for the formula 1, a new formula is given as

[Formula 3]

$$V_{OUT} = \left(\frac{V_{FB} - V_{OUT1}}{R4} + \frac{V_{FB}}{R3}\right) \times R2 + V_{FB}$$

In the Formula 3, as voltage level of the feedback port FB of the PWM controller 11 is kept up constantly by the PWM controller 11, V$_{FB}$ is set to an invariable. As the resistors R2 to R4 have also constant values respectively, the charging voltage V$_{OUT}$ of the smart battery depends on the output voltage level outputted from the first voltage output port OUT1 of the digital-to-analog converter 50. That is, the power level of the charging power V$_{ch}$ applied to the smart battery can be controlled by adjusting the output level of the first voltage output port OUT1 of the digital-to-analog converter 50 through the SM bus.

Figure 4B:
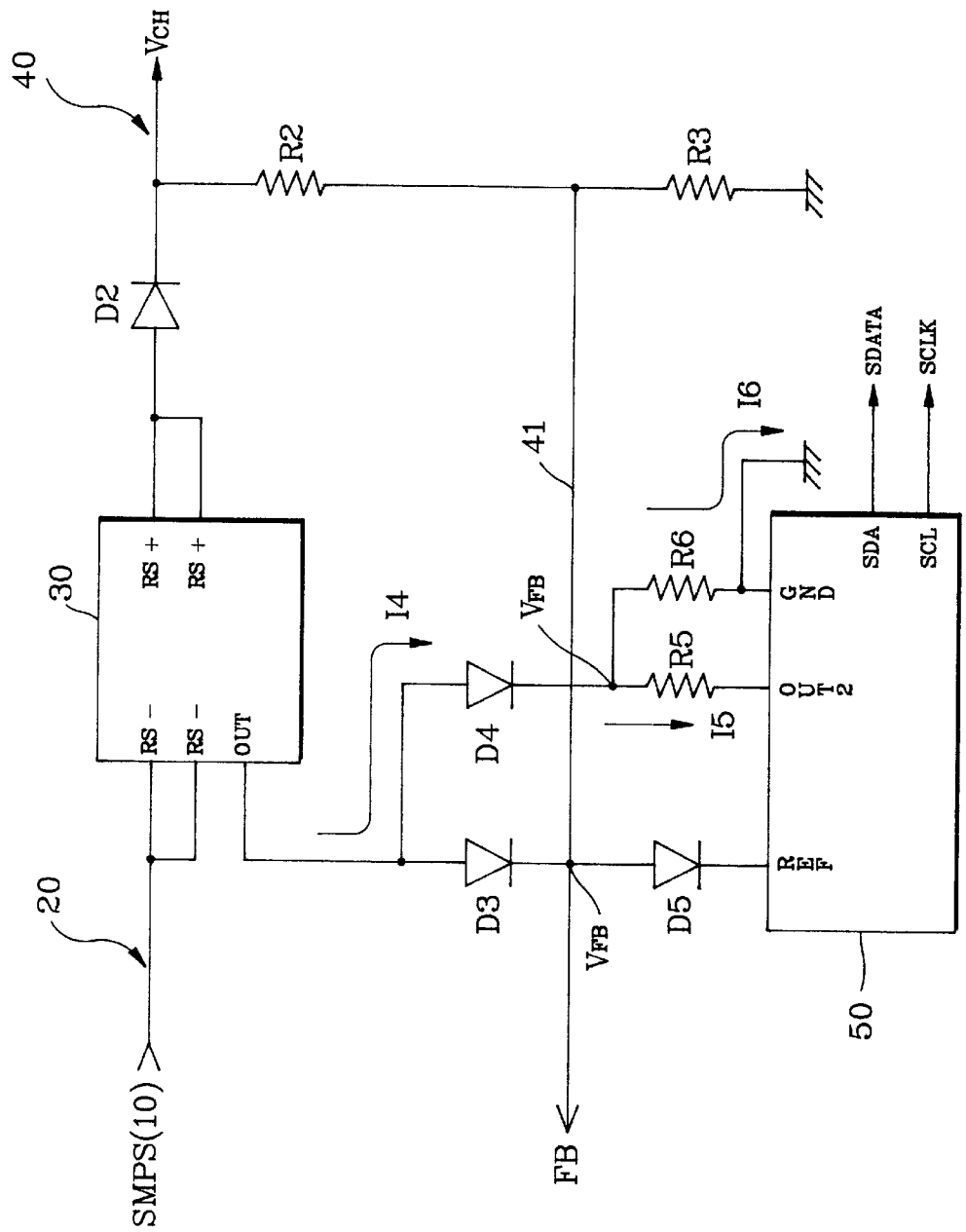

Here, with reference to FIG. 4b, the control operations of the charging current for the smart battery is discussed.

FIG. 4b is a schematic diagrams showing a main part of the smart battery charger illustrated in FIG. 3.

As input impedances of the feedback port FB of the PWM controller 11 and the reference voltage input port REF of the digital-to-analog converter 50 have infinite values ideally, the current I4, outputted through the output port OUT of the current detector 30, is expressed as a sum of the current I5 flowing through resistor R5 and the current I6 through resistor R6, that is,

[Formula 4]

$$I4 = I5 + I6$$

As discussed above, when expressing the voltage level of the feedback port FB of the PWM controller 11, that is, the voltage level of the line 41 as V$_{FB}$, the voltage of the node between diode D4 and resistor R5 or R6 is also set to V$_{FB}$, since forward bias voltages of diode D3 and D4 are identical with each other. So, when expressing the voltage level of the second voltage output port OUT2 of the digital-to-analog converter 50 as V$_{OUT2}$, they are expressed as a following formula.

[Formula 5]

$$I5 = \frac{V_{FB} - V_{OUT2}}{R5} \quad \text{and } I6 = \frac{V_{FB}}{R6}$$

And when substituting the formula 5 for the formula 4, a new formula is given as

[Formula 6]

$$I4 = \frac{V_{FB} - V_{OUT2}}{R5} + \frac{V_{FB}}{R6}$$

Here, as the $V_{FB}$, R5 and R6 have invariable values, the output current I4, outputted through the output port OUT of the current detector 30, is set by the output voltage $V_{OUT2}$ of the second voltage output port OUT2 of the digital-to-analog converter 50.

As described above in detail, the output current, outputted to the RS+ port of the current detector 30, is outputted in proportion to the output current outputted through the output port OUT. That is, 1-ampere output current to the RS+ port of the current detector 30 is outputted per 0.5 mA output current through the output port OUT, subsequently, the charging current for the smart battery can be controlled according to the output voltage outputted to the second voltage output port OUT2 of the digital-to-analog converter 50.

Figure 5:
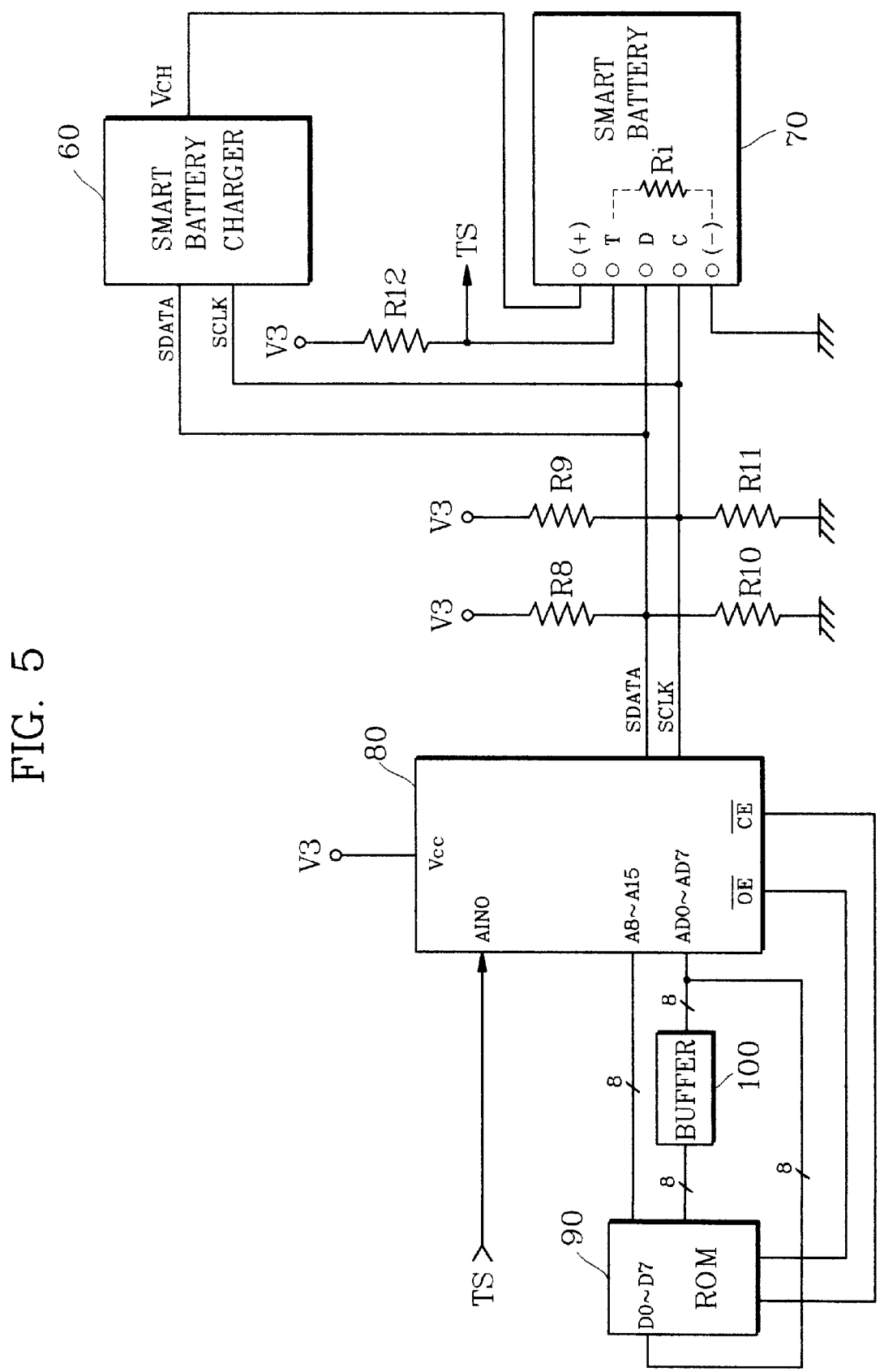
FIG. 5 is a circuit diagram showing a configuration of a smart battery charging system, where the smart battery charger illustrated in FIG. 3 is applied to the smart battery.

FIG. 5 is a block diagram showing a configuration of a smart battery charging system, where the smart battery charger illustrated in FIG. 3 is applied to the smart battery.

Reference numeral 60 denotes the smart battery charger shown in detail in FIG. 3. A smart battery 70 is comprised of a positive port (+), a resistance sensing port T, a SM bus data port D, a SM bus clock port C and a negative port (−). The positive port (+) is linked to the charging power $V_{CH}$ outputted from the smart battery charger 60, and the negative port (−) is grounded. The resistance sensing port T of the smart battery 70 is coupled to predetermined power voltage V3 through a resistor R12 to output battery identifying signals TS from a node formed therebetween. The battery identifying signals TS are utilized to identify the types of smart batteries.

That is, as described above, a resistor Ri connected between the resistance sensing port T and a ground has a value of 500 Ω in case of the Li-ion battery, and in case of the Ni-MH battery, the resistor Ri is a temperature sensor of Negative Thermal Condition type having values of approximately 10 kΩ to 2.5 kΩ according to the battery temperature status. Subsequently, it is possible to identify whether the smart battery is Li-ion type or Ni-MH type.

A keyboard controller 80 executes its ordinary keyboard operations and the control operations of the smart battery charger in accordance with the present invention. The keyboard controller 80 is linked to the smart battery 70 and the smart battery charger 60 through the SM bus, that is, an SM bus data line SDATA and an SM bus clock line SCLK. The battery identifying signals TS are inputted to a first analog signal input port AIN0. The SM bus is coupled to the power voltage V3 through specified pull-up resistors R8 and R9 and grounded through bias resistors R10 and R11.

Reference numeral 90 denotes a program memory, namely, ROM where the operation program is stored, of which a lower 8-bit address port is linked to an address and data port AD0–AD7 of the keyboard controller 80 through a buffer 100 and a upper 8-bit address port is coupled to an address port A8–A15, thus forming a total 16-bit address bus. An 8-bit data port D0–D7 is connected to the address and data port AD0–AD7 of the keyboard controller 80, thus forming a data bus.

In the configuration described above, the keyboard controller 80 identifies the types of smart batteries 70 based on signals inputted through the first analog signal input port AIN0 and reads the smart battery status through the SM bus. Furthermore, the keyboard controller 80 controls the voltage and current values of the charging power $V_{CH}$ applied to the smart battery 70 by controlling the smart battery charger 60 based on the read data. Subsequently, it is possible to execute the charging operations of the smart battery securely according to the embodiment of the present invention described above.

Meanwhile, when the SM bus for connecting the keyboard controller 80, the smart battery charger 60 and the smart battery 70 doesn't operate due to a short, etc., it is impossible to execute appropriate charging operations for various status of the smart battery. When the charging operation for the smart battery, under this non-control status, is executed continuously, it may cause explosion of, particularly, Ni-MH type smart battery due to the overcharge.

Figure 6:
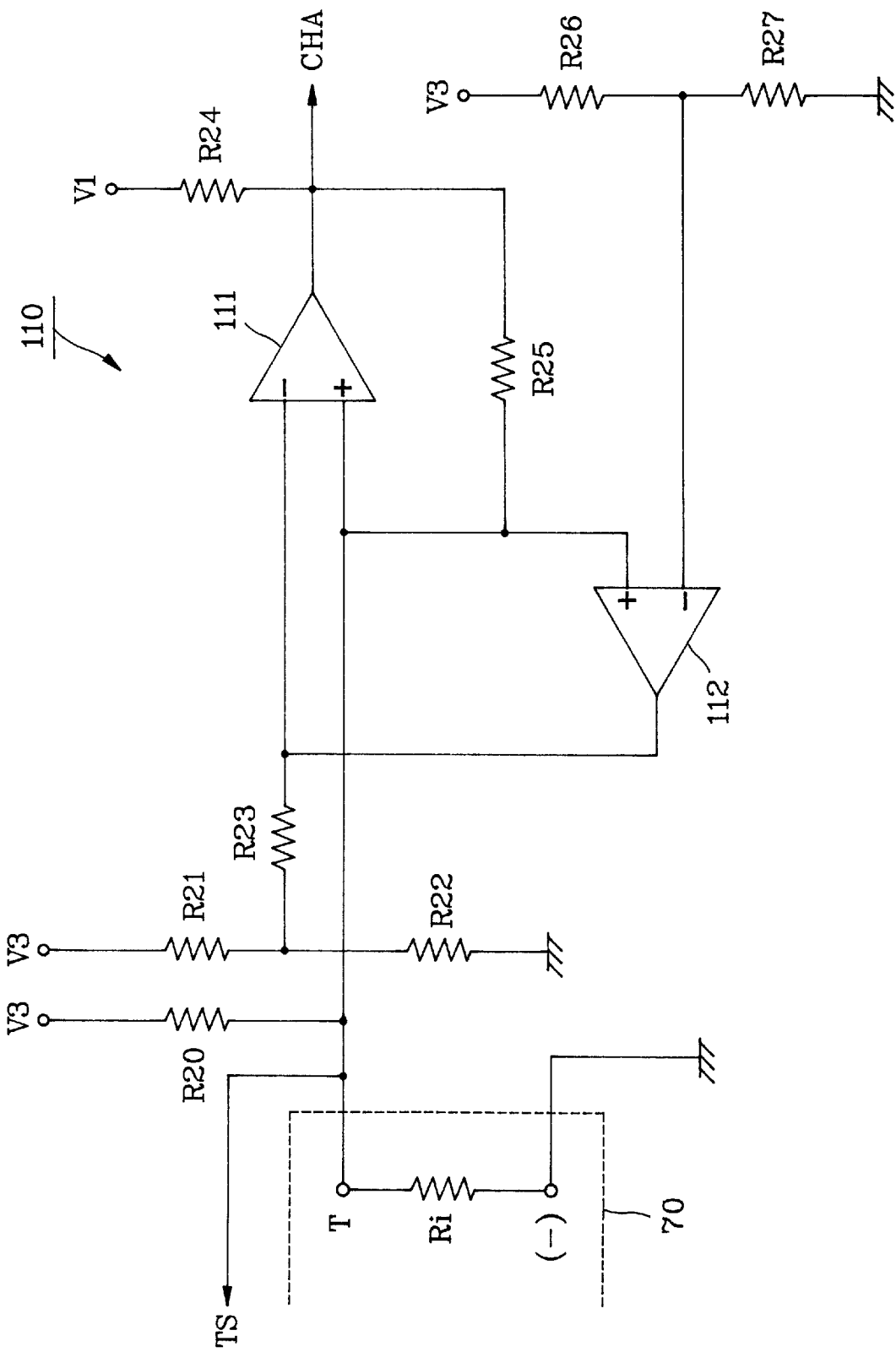
FIG. 6 is a circuit diagram showing a charge signal generator for the charging control of the smart battery.

Now referring to FIG. 6 constructed in consideration of the above problems, FIG. 6 is a circuit diagram showing a configuration of the charge signal generator 110 for generating charge signals for the smart battery 70 by reading the status of the smart battery 70 through a special hardware configuration.

The resistance sensing port T of the smart battery 70 is connected to power voltage V3, for example 5V, through a resistor R20. Resistors R21 and R22 having the same value are coupled in series between the power voltage V3 and a ground. A node between the resistor R20 and the resistance sensing port T of the smart battery 70 is linked to a non-inverting terminal (+) of a first comparator 111 and a node between the resistors R21 and R22 is connected to an inverting terminal (−) of the first comparator 111 through a resistor R23. The node between the resistor R20 and the resistance is sensing port T of the smart battery 70 is coupled to a non-inverting terminal (+) of a second comparator 112, and the power voltage, for example 18V, is connected therebetween through resistors R24 and R25 in series. An inverting terminal (−) of the second comparator 112 is coupled to a node between resistors R26 and R27 serially connected to the power voltage V3 and a ground, respectively. Besides, a node between the resistors R24 and R25 is coupled to an output port of the first comparator and outputs charge signals CHA therefrom. An output port of the second comparator 112 is linked to the inverting terminal (−) of the first comparator 111. Meanwhile, the battery identifying signals are outputted from the node between the resistor R20 and the resistance sensing port T of the smart battery.

As described in detail above, in general, in case of the Li-ion smart battery, the resistor Ri having a value of 500 Ω is connected to the resistance sensing port T , and in case of the Ni-MH battery, a temperature sensor of negative thermal condition NTC type having values of approximately 10 kΩ to 2.5 kΩ according to battery temperatures is coupled to the resistance sensing port T. The temperature sensor has a resistance value of about 10 kΩ when the temperature of the smart battery is 25° C., and about 2.5 kΩ when 75° C. Accordingly, it is necessary to charge the smart battery 70 when the resistor Ri connected to the resistance sensing port T of the smart battery 70 is 500 Ω, or greater than or equal to 2.5 kΩ, and shut down the charging operations of the smart battery 70 when the resistance value of the resistor Ri is within the range of 500 Ω<Ri<2.5 kΩ.

In the configuration of FIG. 6, as the resistance values of the resistor R21 and R22 are set to the same value, the input voltage applied to the inverting terminal (−) of the first comparator 111 is set to V3/2. When the resistance value of the resistor R20 connected to the resistance sensing port T of the smart battery 70 is set to a value greater than 2.5 kΩ, for example 2.7 kΩ, and in case the smart battery is Li-ion type or the temperature of Ni-MH smart battery is greater than or equal to 75° C., the input voltage applied to the non-inverting terminal (+) of the first comparator 111 is set to be less than V3/2, thus outputting a signal of "L" level from the first comparator. Then, when the "L" level signal is outputted, a voltage level from the resistance sensing port T of the smart battery 70 is applied to the non-inverting terminal (+) of the second comparator 112. Here, when the resistance value of the resistor R20 is 2.7 kΩ and the power voltage V3 is 5V, the voltage value is set to approximately 0.87V in case of the Li-ion smart battery, 2.4V in case of the Ni-MH smart battery. When the input voltage of the inverting terminal (−) of the second comparator 112 is set to, for example 1V, by adjusting the resistance values of the resistor R26 and R27 connected to the inverting terminal (−) of the second comparator 112 properly, the second comparator 112 outputs "L" level signal in case of the Li-ion smart battery and "H" level signal in case of the NI-MH smart battery. Then, when "L" level signal is outputted from the second comparator 112 in case of the Li-ion smart battery, the input voltage applied to the inverting terminal (−) of the s first comparator 111 is decreased to "L" level and the output level of the first comparator 111 keeps "H" level. That is, in case of the Li-ion smart battery, the first comparator 111 outputs "H" level charge signal CHA constantly. Meanwhile, when "L" level signal is outputted from the first comparator IC 111 in case of the Ni-MH smart battery, the input voltage applied to the non-inverting terminal (+) of the second comparator 112 is set to about 2.4V. Accordingly, the output of the second comparator 112 is kept up to "H" level and the first comparator 111 outputs "L" level charge signal CHA. The "L" level charge signal CHA is continued till the resistance value of the resistor Ri therein becomes less than that of the resistor R20 as the temperature of the smart battery is decreased.

Accordingly, while the "H" level charge signal CHA is outputted continuously for the Li-ion smart battery, in case of the Ni-MH smart battery, the "H" level charge signal CKA is outputted when the charging temperature is less than a predetermined limit and the "L" level charge signal CHA is outputted when the charging temperature is increased more than a predetermined limit.

In the configuration described above, it can prevent explosion of Ni-MH smart battery due to the over charge, by controlling the charging operations for the smart battery using the charge signals CHA. As described above, while the boundary temperature of Ni-MH smart battery is set to 75° C3., it can be set optionally by changing the value of the resistor R20 connected to the resistance sensing port T of the smart battery.

Figure 7:
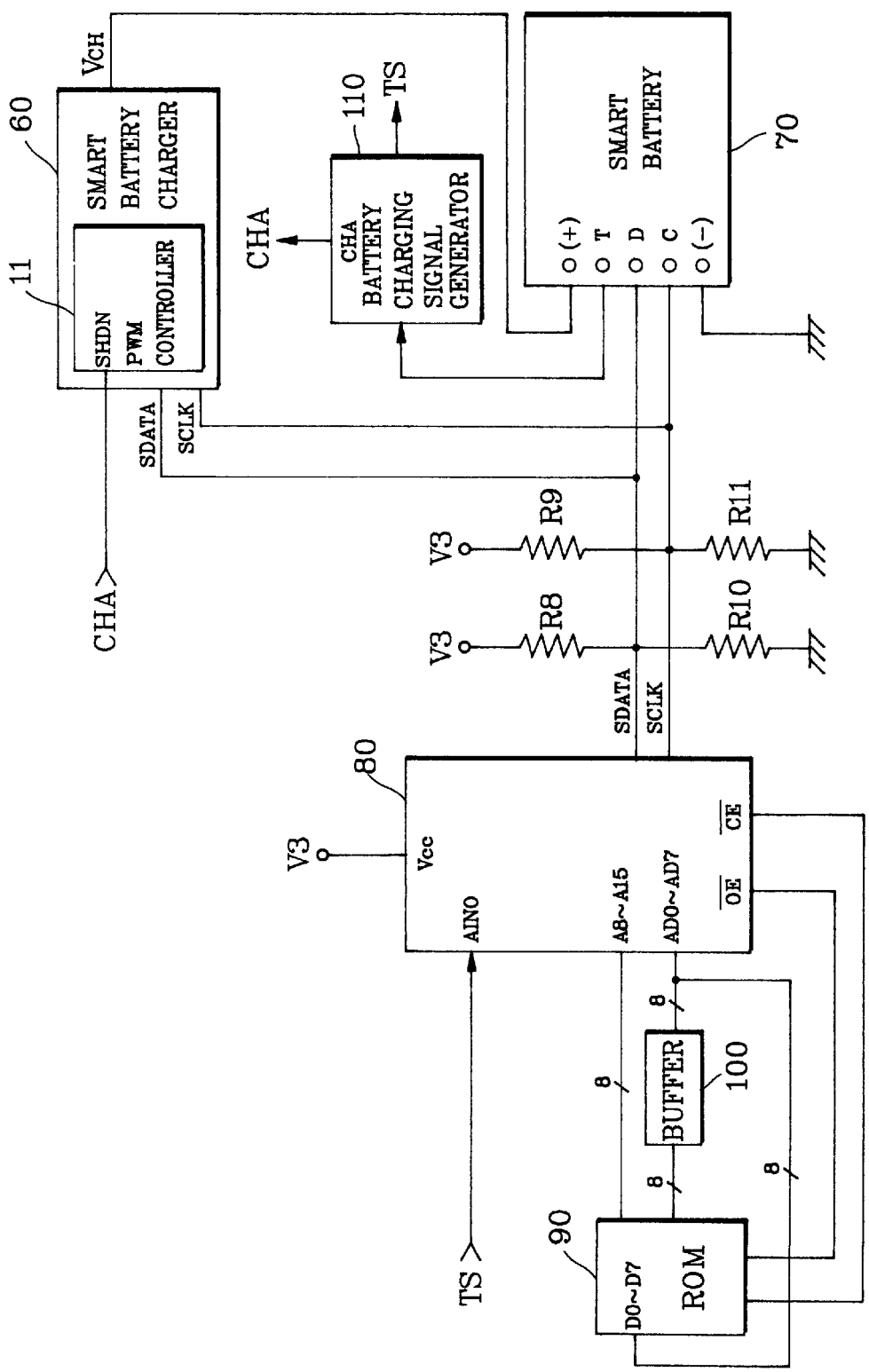
FIG. 7 is a circuit diagram showing a smart battery charging system, wherein the charge signal generator illustrated in FIG. 6 is applied to the smart battery charging system in FIG. 5 in accordance with another embodiment of the present invention.

FIG. 7 is a block diagram showing a smart battery charging system, wherein the charge signal generator 110 illustrated in FIG. 6 is applied to the smart battery charging system show in FIG. 5

The charge signal generator 110 is coupled to the resistance sensing port T of the smart battery 70. The battery identifying signals TS outputted from the charge signal generator 110 are linked to the first analog signal input port AIN0, and the charge signals CHA are joined to a shut-down signal input port SHDN of the PWM controller provided in the smart battery charger 60.

Here, when "H" level charge signal CHA is inputted from the charge signal generator 110, the PWM controller 11 executes the control operations in the normal status. When "L" level charge signal CHA is obtained from the charge signal generator 110, the PWM controller 11 shuts off the outputs of the driving signal output ports DH and DL for the FET 13 and 14 in FIG. 3, and suspends the driving of the FET 13 and 14, thus suspending the overall driving of the SMPS 10. Therefore, the smart battery 70 cannot be charged by the smart battery charger 60 in FIG. 7, as a power supply to the current detector 30 is shut off due to the suspended SM bus 10. That is, according to the above embodiment of the invention, it is possible to execute the charging operations for the smart battery securely by controlling the smart battery charger based on the charge signals generated according to the resistance values of the smart batteries.

Meanwhile, in the embodiments described with reference to FIG. 5, FIG. 6 and FIG. 7, the smart battery charger 60 operates by means of an external power V1 of 18V obtained from an adapter, not depicted, and the keyboard controller 80 and SM bus operates using an internal power source V3, for example 5V. The internal power source V3 is supplied from a power supply system, comprising the SMPS 10, that is driven by a power on-off switching.

In general, after using the notebook computer with an external power source when available, the user is used to turn off the computer by means of a power on-off switch, leaving the external power source connected to the computer. However, in the above configuration, operational power is supplied to the smart battery charger 60 when the notebook computer is connected to the external power source. Here, if the user turns off the notebook computer using the power on-off switch under the circumstances, the power supply system is set to the non-operational status and accordingly the keyboard controller 80 cannot execute the control operation for the smart battery charger 60. This may cause explosion of the smart battery due to over charge.

To solve the problems described above, it can be suggested that the operations of the smart battery charger 60 be suspended when the notebook computer is turned off. However, the user should turn on the notebook computer every time when charging the smart battery, which causes inconvenience.

Besides, it needs charging current of 1800 mA to charge the smart battery as usual. Meanwhile, if the charging current of 1800 mA is applied to the smart battery when the notebook computer is operated by the user, the operational power is lacking materially in driving the notebook computer. Therefore, it is necessary to secure sufficient operational power for ensuring a stable operation of the portable computer by controlling the amount of charging current according to the on-off status of the notebook computer.

Figure 8:
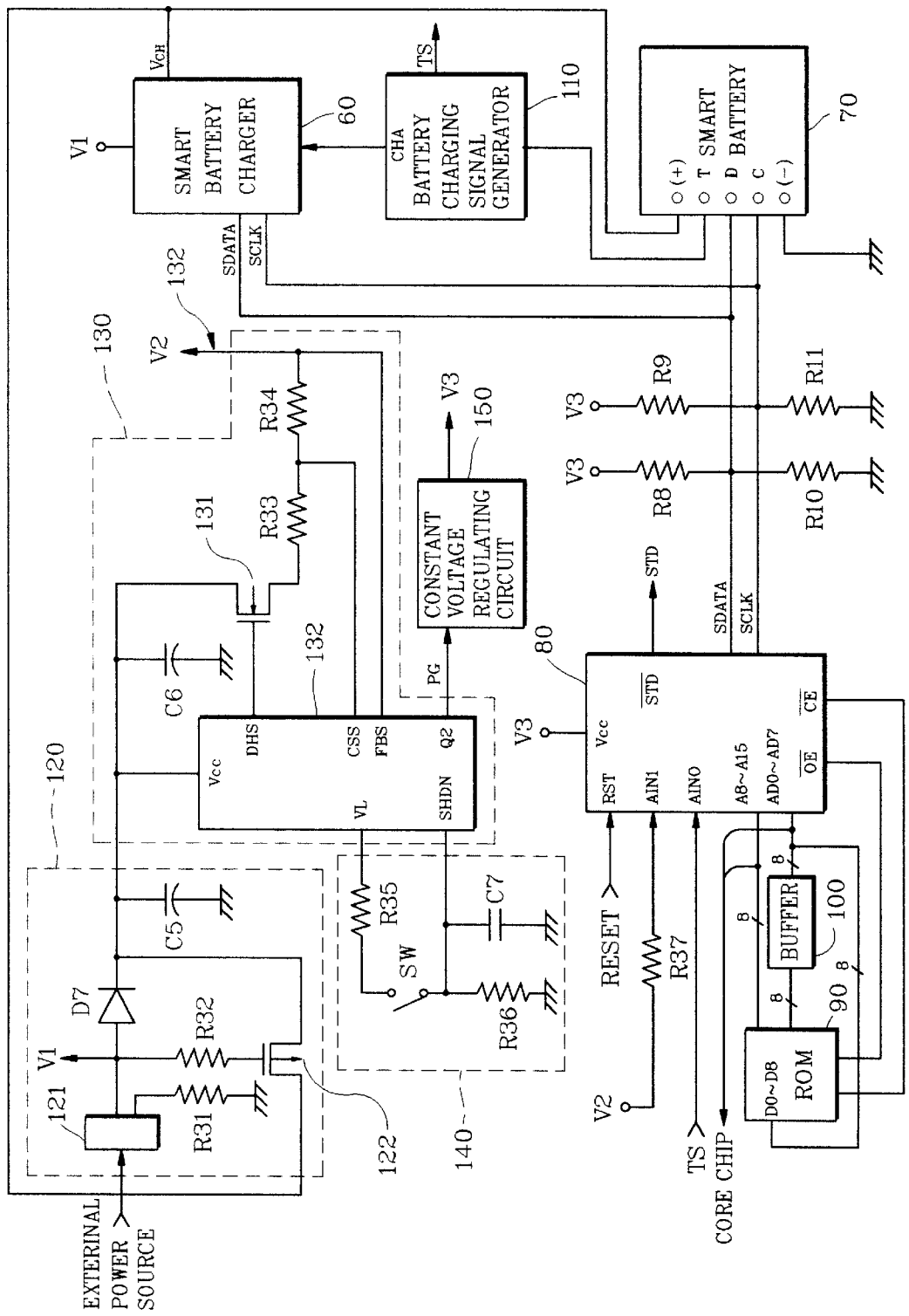
FIG. 8 is a circuit diagram of a power supply system, wherein the smart battery charging system in FIG. 7 is applied to a notebook computer.

FIG. 8 is a circuit diagram of a power supply system, where the smart battery charger in FIG. 7 is applied to a notebook computer.

Reference numeral 120 denotes a power input part for 1-0 inputting output powers, alternatively, from an external power source or the smart battery 80, where a power input port 121 is connected to the external power source, for example an adapter, not depicted. One end of the power input port 121 is grounded by way of a resistor R31, and the other end of the power input port 121 is linked to an anode of a diode D7 for preventing reverse current. The unit outputs first power voltage V1, that is, power voltage of 18V from the node formed therebetween.

The positive port (+) of the smart battery 70 is coupled to a cathode of the diode D7 through the current of P-channel FET 122, of which the gate is connected to the first power voltage V1 through a resistor R32. Accordingly, the FET 122 is turned off so as to shut off the power input to the smart battery 70 when the external power is inputted through the power input port 121 and the first power voltage Vl is outputted through the diode D7, while it is turned on to input the output power of the smart battery 70 when the external power is not inputted. The external power outputted through the diode D7 and the battery power through the FET 122 are inputted by way of a smoothing condenser CS to an SMPS 130 described hereinafter.

The SMPS 130 generates second power voltage V2, utilized as an operational power of the notebook computer, based on the input power obtained from the power input part 120. The input power from the power input part 120 is linked to a power output line 132 by way of a smoothing condenser C6, a current passage of an N-channel FET 131 and resistors R33 and R34. Reference numeral 132 denotes a PWM controller, in which a driving signal output port DHS is coupled to the gate of the FET 131, and a CSS port and a FBS port for checking the output power are linked to both ends of the resistor R34. A voltage output port VL and a shut-down signal input port SHDN are connected to a power on-off signal input part 140 described hereinafter. The PWM controller 132, using the input power from the power input part 120 as an operational power Vcc, outputs "H" level power good signal PG, in case a power switch SW, discussed hereinafter, is on and "H" level signal is inputted to the shut-down input port SHDN, and further, if the operational power Vcc is supplied satisfactorily. The PWM controller 132 first outputs, for example 5 V voltage, to the voltage output port VL when the operational power Vcc is inputted. When "H" level signal is inputted to the shut-down signal input port SHDN, the PWM controller 132 outputs "H" level driving signal to the driving signal output port DHS and checks the voltage level inputted to the CSS port and FBS port. Here, the PWM controller 132 keeps the level of the second power voltage V2 constant by controlling the on-off of the FET 131 so that the level difference between the CSS port and FBS port is, for example 10 mV. Here, the PWM controller 132 outputs "H" level power good signal PG.

Reference numeral 140 denotes a power on-off signal input part, in which a resistor R35 and a power switch SW are serially coupled to each other between the power output port VL and the shut-down signal input port SHDN of the PWM controller 132, and a bias resistor R36 and a bypass condenser C7 are connected to the shut-down signal input port SHDN and grounds. The power on-off signal input part 140 sets the PWM controller 132 to a non-operational status, that is, a shut-down status, by inputting "L" level signal to the shut-down signal input port SHDN of the PWM controller 132, when the user turns off the power switch, while it sets the PWM controller 132 to an operational status by inputting "H" level signal, obtained from the power output port VL, to the shut-down signal input port SHDN of the PWM controller 132 through the resistor R35 and the power switch SW, when the user turns on the power switch.

Meanwhile, a constant voltage regulating circuit 150 generates third power voltage V3 for driving the battery charge circuitry, that is, keyboard controller 80, SM bus and charge signal generator 110, based on the power good signal PG outputted from the PWM controller 132 of the SMPS 130.

Figure 9:
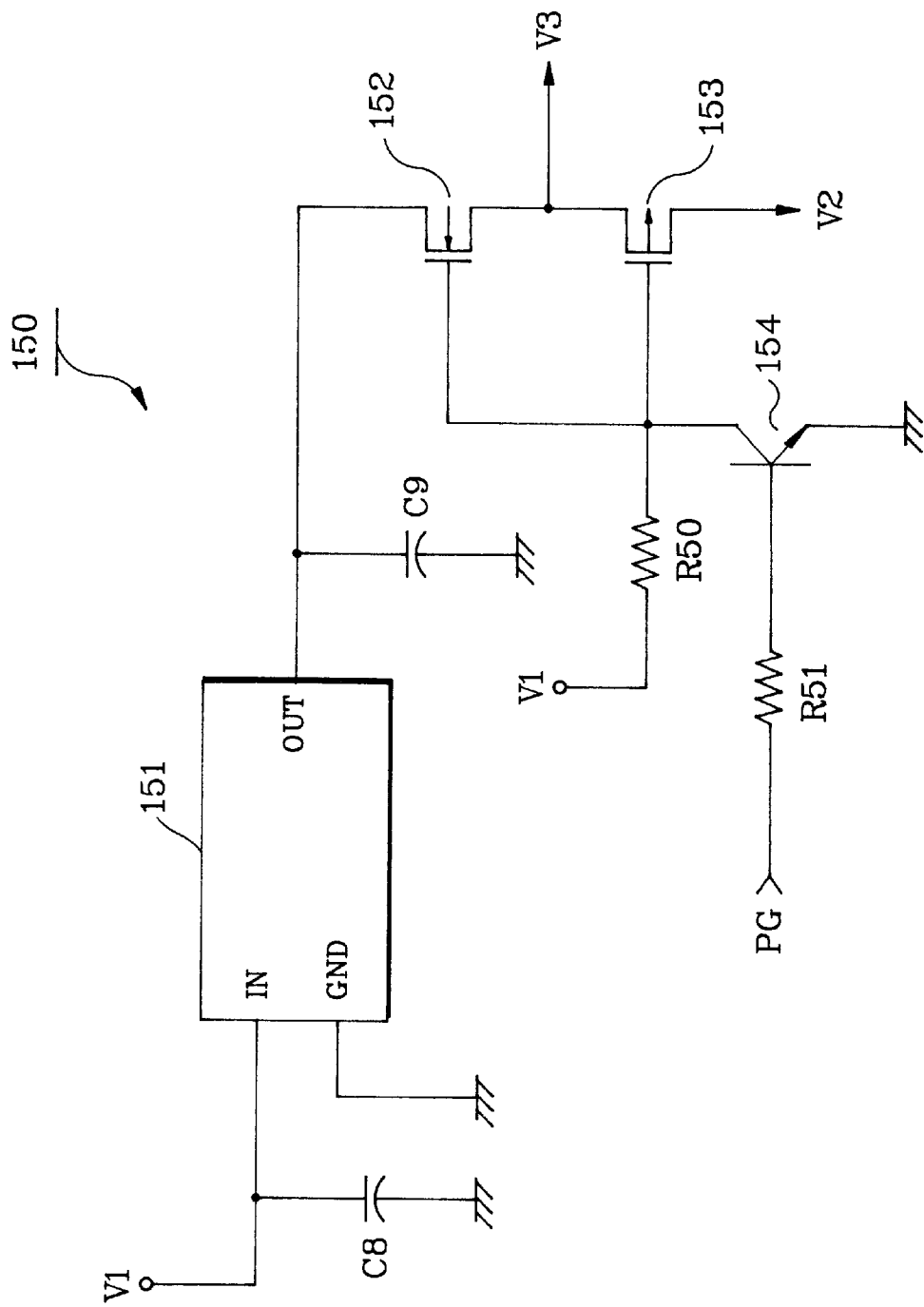
FIG. 9 is a circuit diagram illustrating a configuration of a constant voltage regulating circuit in the power supply system of FIG. 8.

Referring to FIG. 9, a circuit diagram illustrating a configuration of the constant voltage regulating circuit in the power supply system, where first power voltage V1, that is, external power of 18V, is connected to an input port IN of a 5V regulator 151 by way of a smoothing condenser C8. An output OUT of the regulator 151 is coupled to a source of N-channel FET 152 through a smoothing condenser C9. Besides, the second power source V2 of 5V, outputted from the SMPS 130 in FIG. 8, is linked to a drain of P-channel FET 153. Then, the third power voltage V3 is outputted from a node formed between the drain of N-channel FET 152 and the source of P-channel FET 153 connected to each other. Gates of the N-channel FET 152 and the P-channel FET 153 are coupled to the first power voltage V1 by way of a resistor R50 and grounded through emitter collectors of a NPN-transistor 154. The base of the NPN-transistor is linked to the power good signal PG by way of a resistor R51.

In FIG. 8, the second power voltage V2 outputted from the SMPS 130 is coupled to a second analog signal input port AIN1 through a resistor R37. Meanwhile, a reset signal RESET is inputted when the power switch is turned on and off. As will be discussed in detail below, a save-to-disk signal STD is to store data the user made using the notebook computer.

Hereinafter, the operations of the power supply system constructed as described above will be explained in detail.

In FIG. 8, when an external power is inputted through the power input port 121 of the power input part 120, the first power voltage V1 is supplied to the SMPS 130 through the diode D7. Here, if the power switch is off, the second power voltage v2 is not outputted, and the power good signal PG is set to "L" level. If the power switch is on, the PWM controller 132 of the SMPS 130 operates to output the second power voltage V2 and "H" level power good signal PG.

Meanwhile, when the external power is not inputted through the power input port 121 of the power input part 120, the FET 122 is turned on and supplies the output power from the smart battery 70 to the SMPS 130. Here, if the power switch is off, the second power voltage V2 is not outputted and the power good signal PG is set to "L" level. If the power switch is on, the PWM controller 132 of the SMPS 130 operates to output the second power voltage V2 and "H" level power good signal PG.

The output status of the power good signal and the power voltages according to the input powers and the power switch on-off status are expressed as a following Table 1;

TABLE 1

| External Power Source | Smart Battery Power | Power Switch (SW) | V1 | V2 | PG |
|---|---|---|---|---|---|
| O | Don't care | Off | O | X | L |
| O | Don't care | On | O | O | H |
| X | O | Off | X | X | L |
| X | O | On | X | O | H |

In FIG. 9, if the power good signal PG is "H" level, that is, the power switch SW is on, the transistor 154 is also turned on. Then, if the gate voltage of N-channel FET 152 and P-channel FET 153 becomes "L" level, accordingly, the P-channel FET 153 is turned on and the N-channel FET 152 is off. Subsequently, in this case, the second power voltage V2 from the SMPS 130 is outputted as the third power voltage V3.

Meanwhile, if the power good signal PG is "L" level, that is, the power switch is off, the transistor 154 is also turned off. Then, since the first power voltage V1 is applied to the gate of N-channel FET 152 and P-channel FET 153 accordingly, if the first power voltage V1 is obtained, that is, "H" level, the N-channel FET 152 is turned on and the P-channel FET 153 is off. Subsequently, the power voltage from the regulator 151 is outputted to the third power voltage V3 through the N-channel FET 152. Here, since the regulator 151 outputs predetermined output voltage only when the first power voltage V1 exists according as an external power is inputted, the third power voltage is outputted only when an external power is inputted to the power input port 121, ultimately.

In the above configuration, when the user turns on the power switch SW, the second power voltage V2 from the SMPS 130 is supplied securely as an operational power to the keyboard controller 80, SM bus and the charge signal generator 110, and when the user turns off the power switch SW, predetermined operational power is generated, based on the external power, that is, the first power voltage V1 inputted from the power input port 121, and supplied to the system, such as the keyboard controller 80, the SM bus and the charge signal generator 110.

Accordingly, if the smart battery charger 60 may operate according as the notebook computer is connected to the external power source, the operational power is also supplied to the battery charge control circuitry, thus executing the charging operations securely. Besides, in the configuration, since the second power voltage V2 from the SMPS 130 is inputted to the second analog signal input port AIN1 of the keyboard controller 80, the keyboard controller 80 can detect the on-off status of the notebook computer based on the signal inputted therethrough.

Therefore, if the keyboard controller 80 can control the smart battery charger 60 to set the charging current, supplied to the smart battery 70, to 1800 mA for example, when the notebook computer is turned off, and to 600 mA for example, when the notebook computer is on, the charging operations for the smart battery 70 can be executed securely, not affecting the operation of the notebook computer.

Meanwhile, as described above, the Li-ion smart battery needs a constant voltage charge of 12.3 V, and the allowable error is limited less than 1%. However, in the smart battery charger illustrated in FIG. 3, as the error rates of the resistors R2 and R3, coupled to the charging power output port 40, are about 1% respectively and the error rate of the feedback voltage FB set by the PWM controller 11 is about 3%, the overall hardware error rate is set to about 5%. If the charging voltage for the Li-ion smart battery exceeds, for example 12.45 V, due to the errors, the Li-ion smart battery may burst.

Subsequently, it is necessary to provide stable charging operations for the Li-ion smart battery by compensating for the hardware errors with software methods.

Furthermore, the smart battery is converted into a sleep mode for itself when the charging power is over discharged. However, in the sleep mode, as it is impossible to execute the data access operation through SM bus, etc., the smart battery charger may not operate.

Figure 11A:
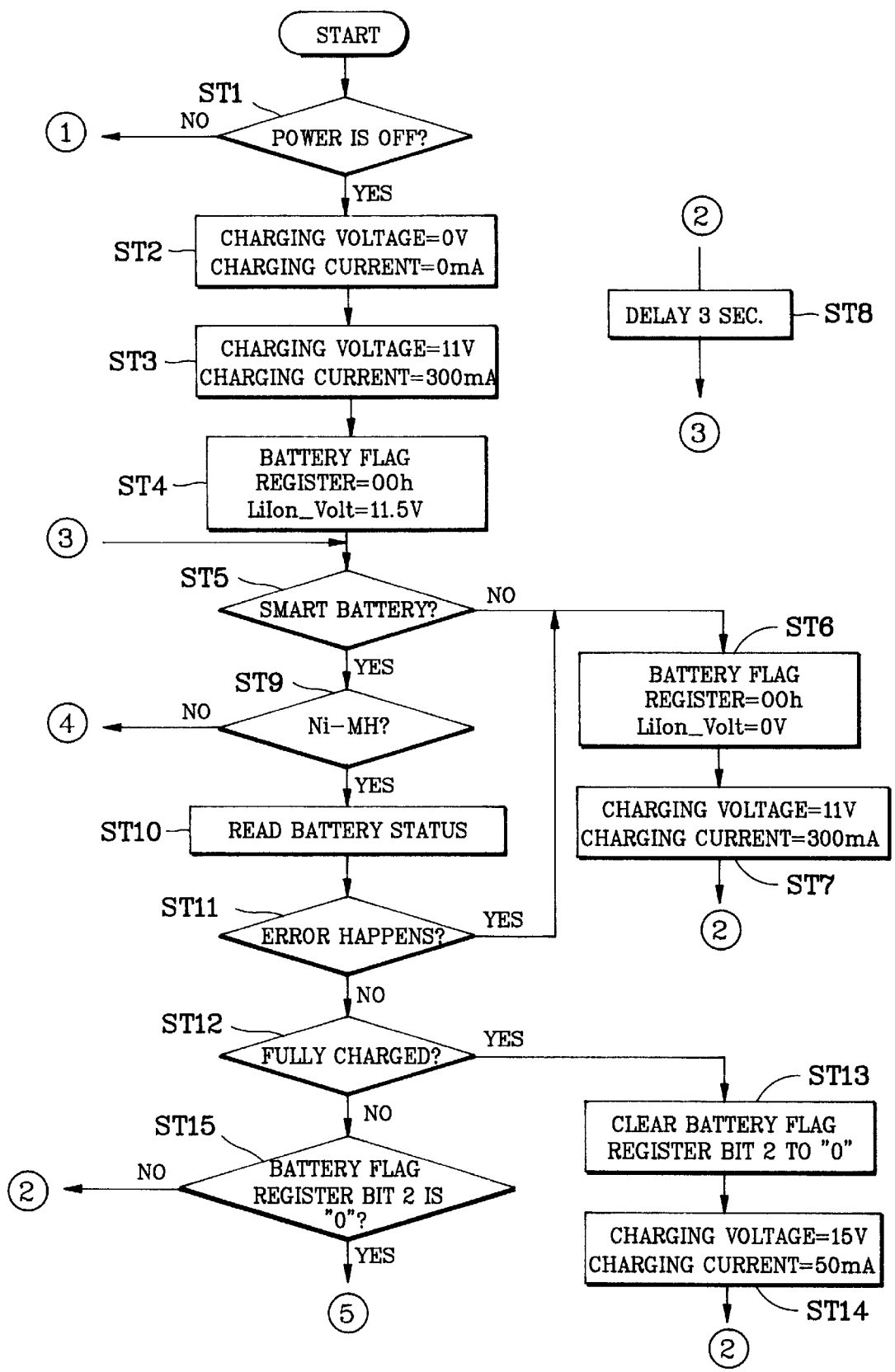
FIG. 11a–11n are flowcharts explaining the operations of the power supply system in FIG. 8.
Figure 11B:
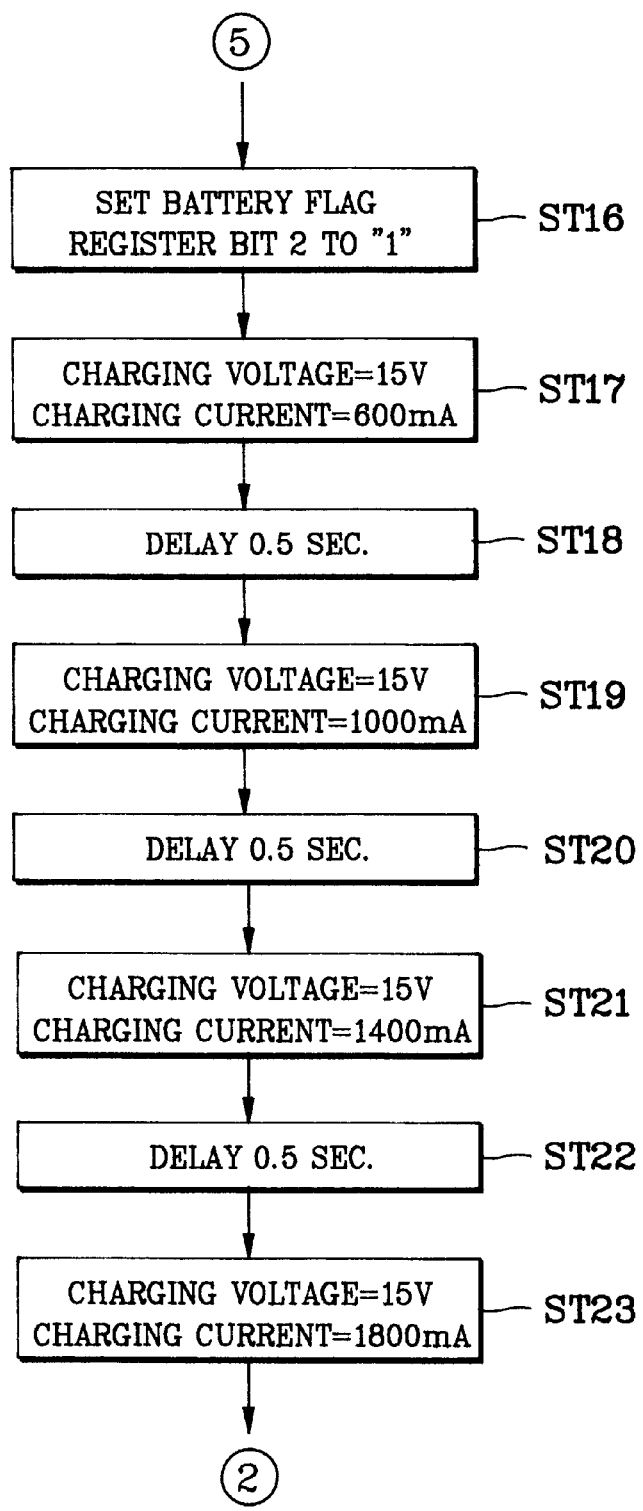
Figure 11C:
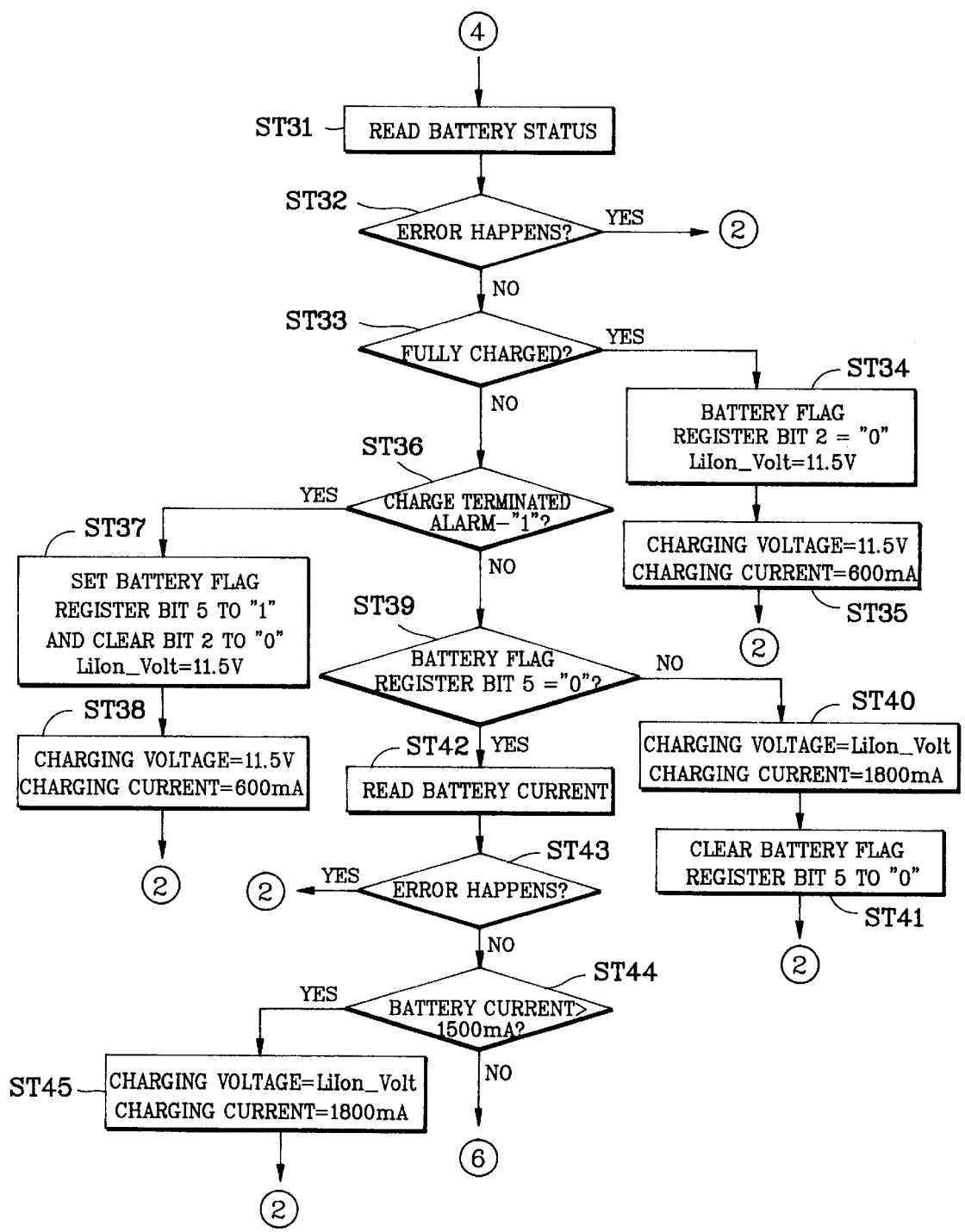
Figure 11D:
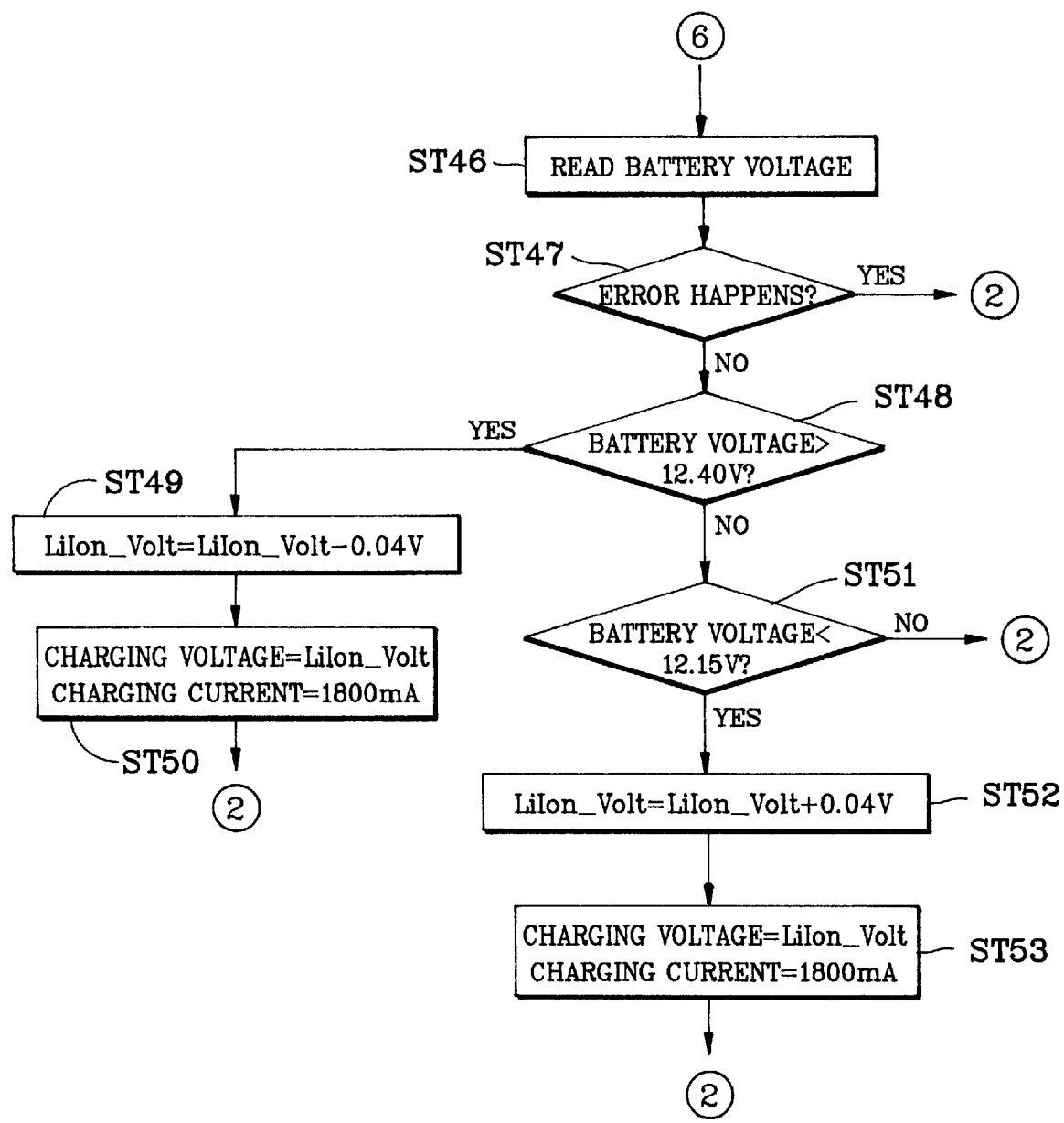
Figure 11E:
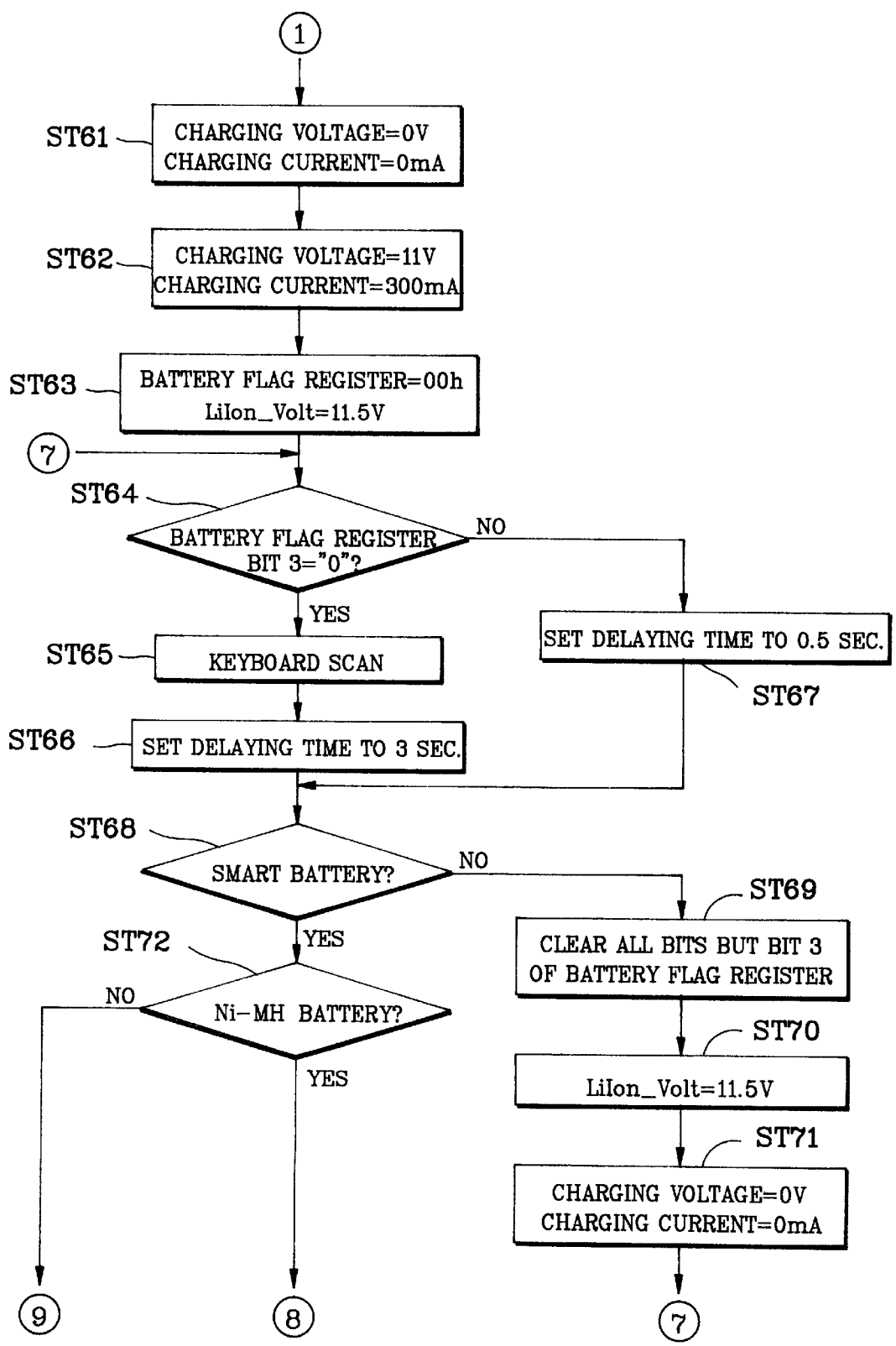
Figure 11F:
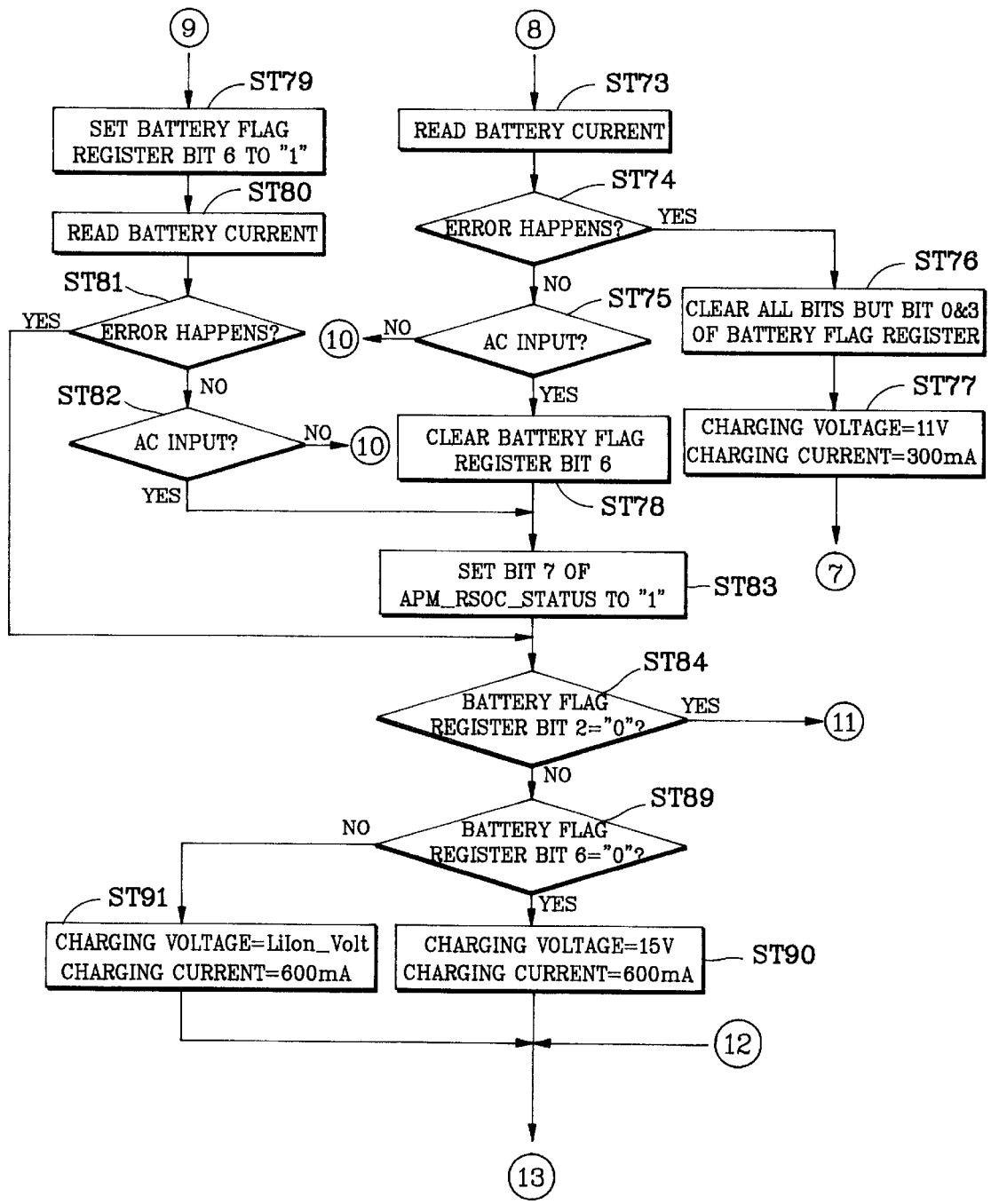
Figure 11G:
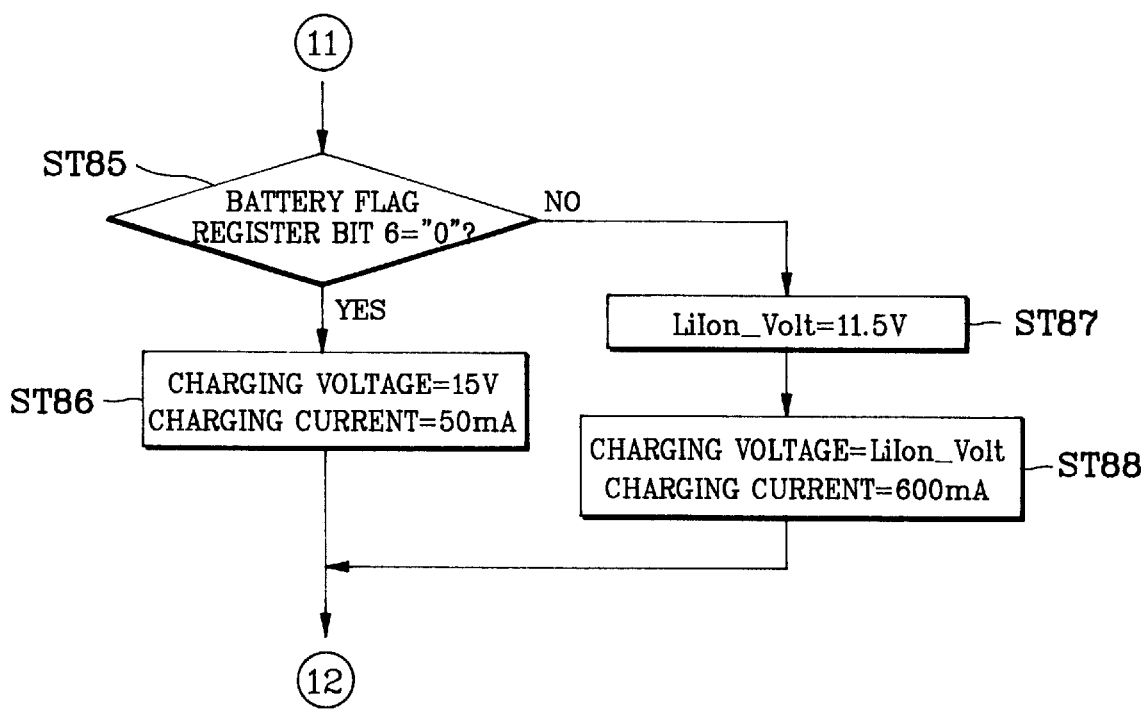
Figure 11H:
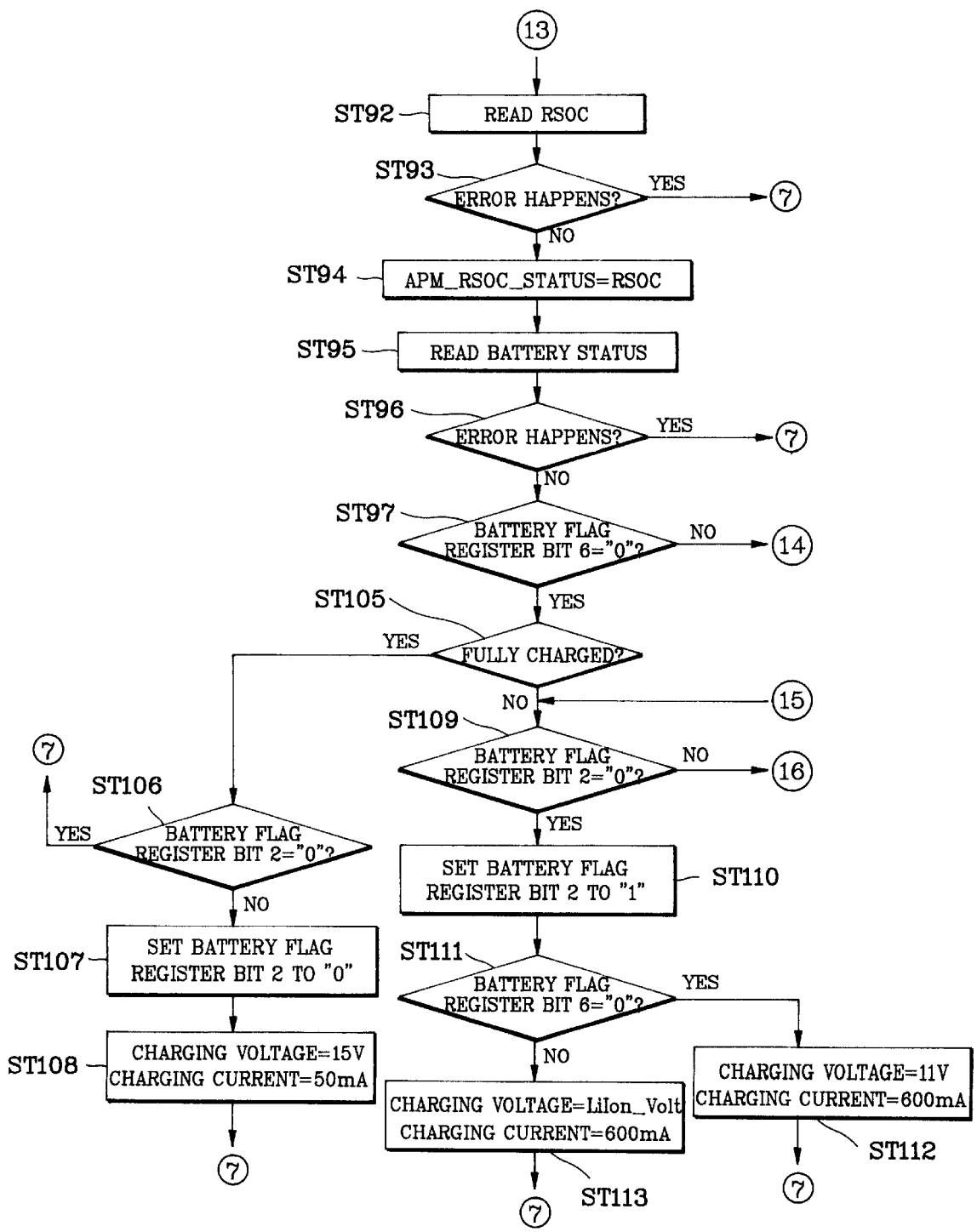
Figure 11I:
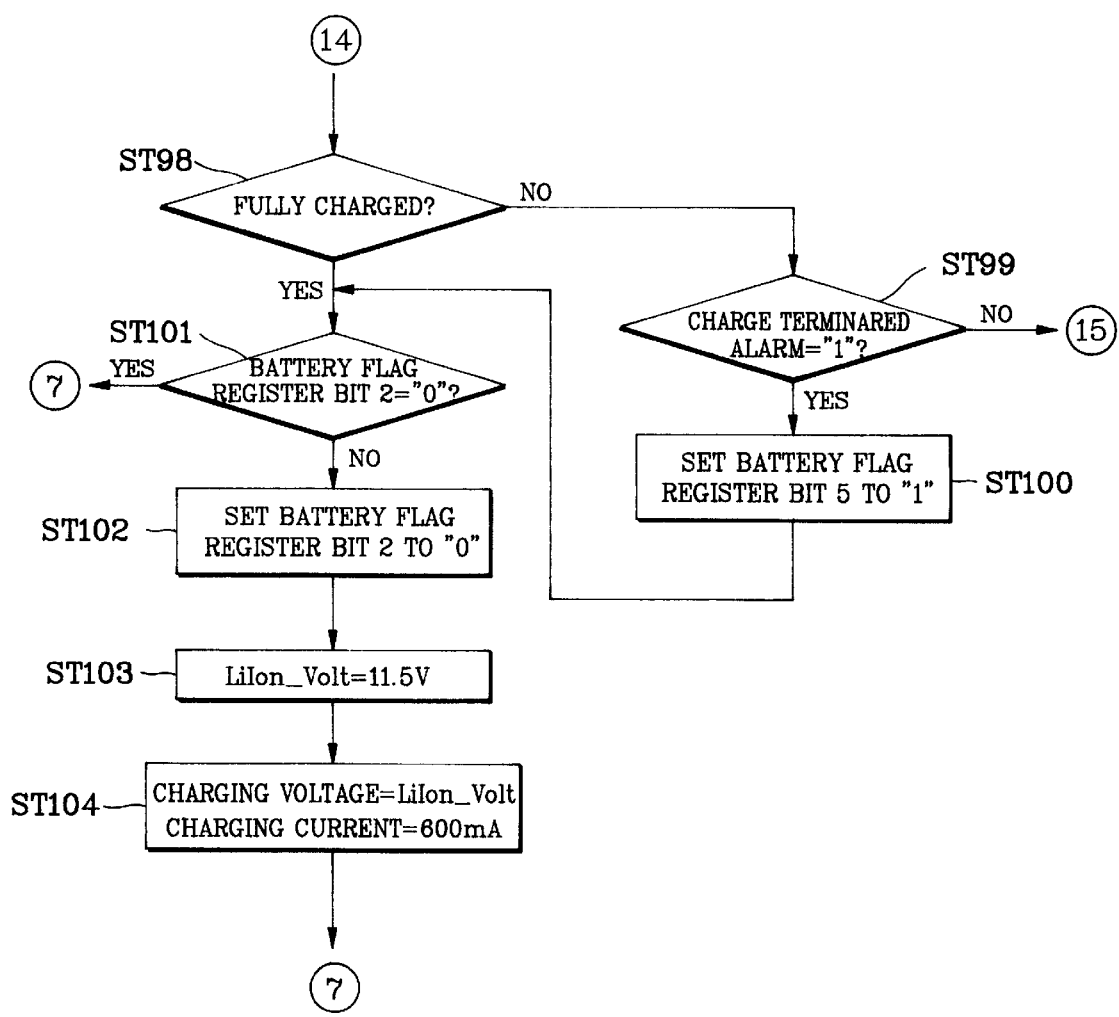
Figure 11J:
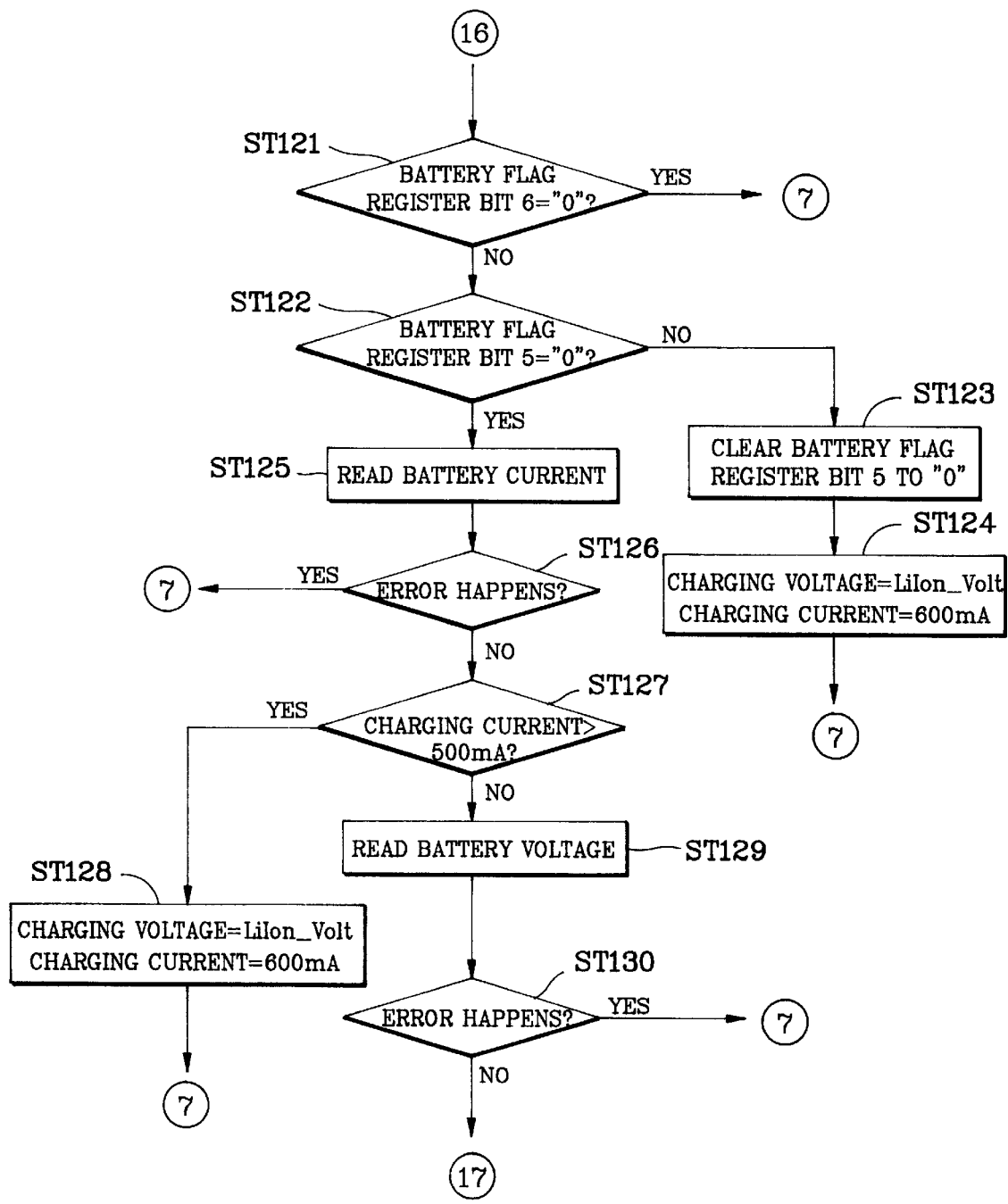
Figure 11K:
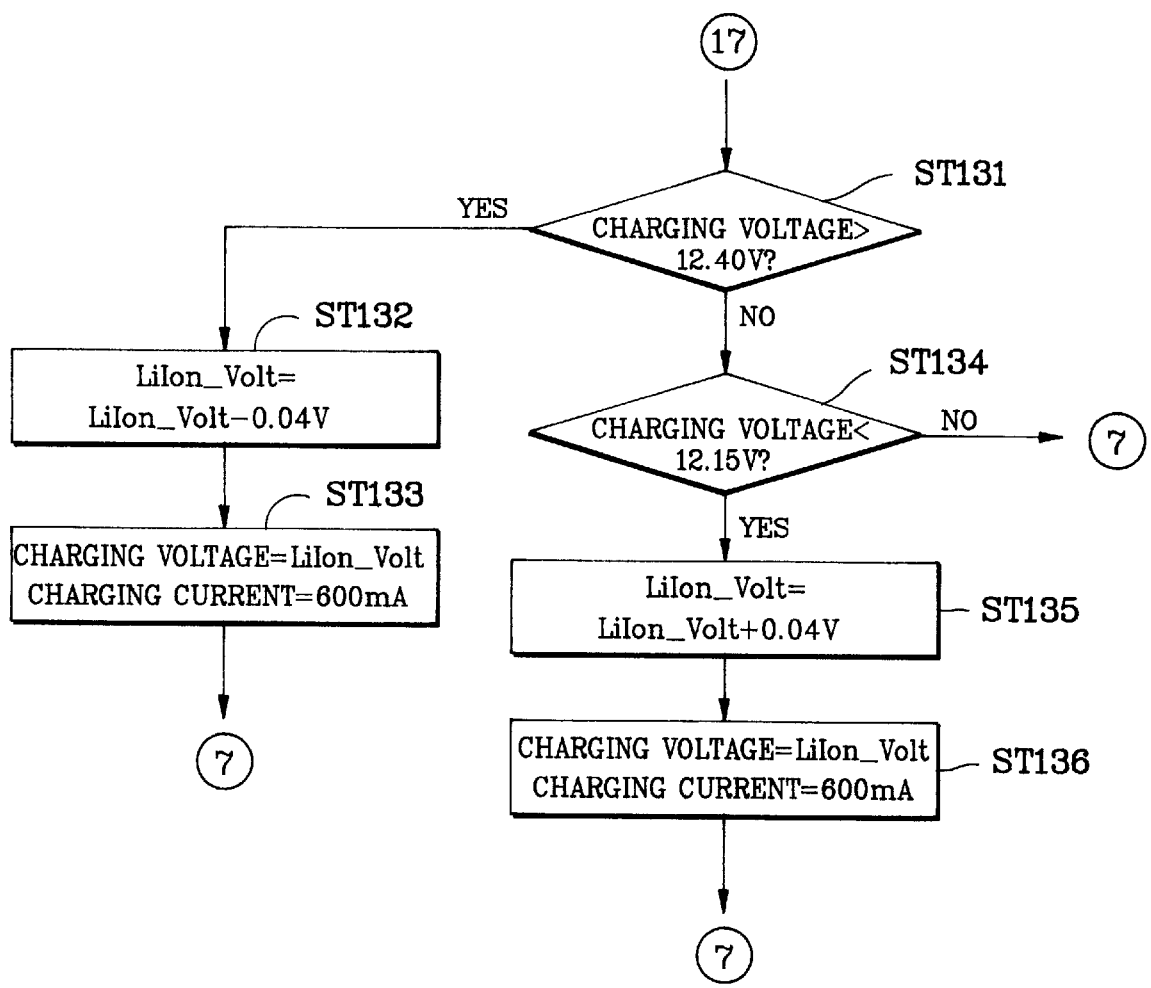
Figure 111:
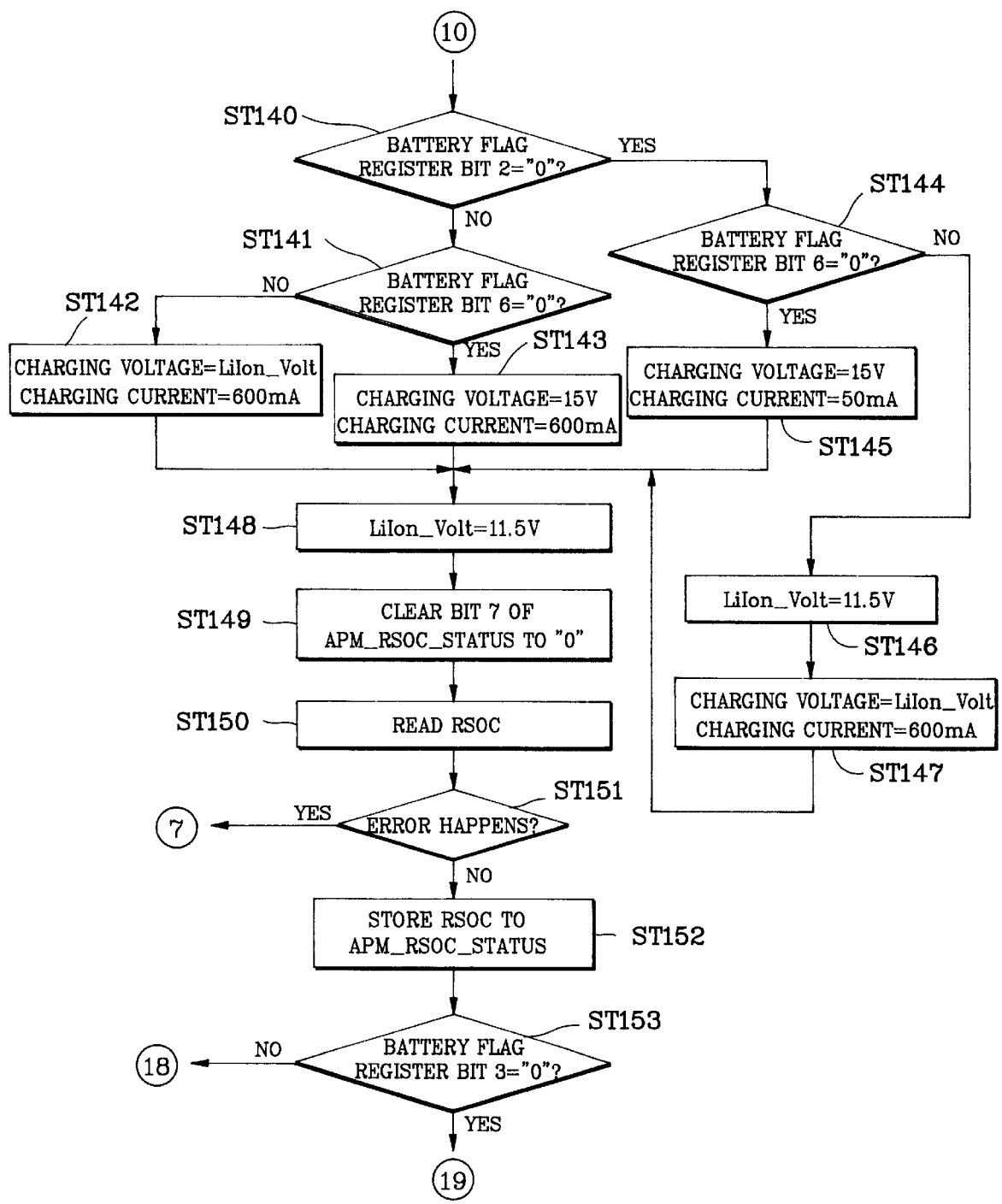
Figure 11M:
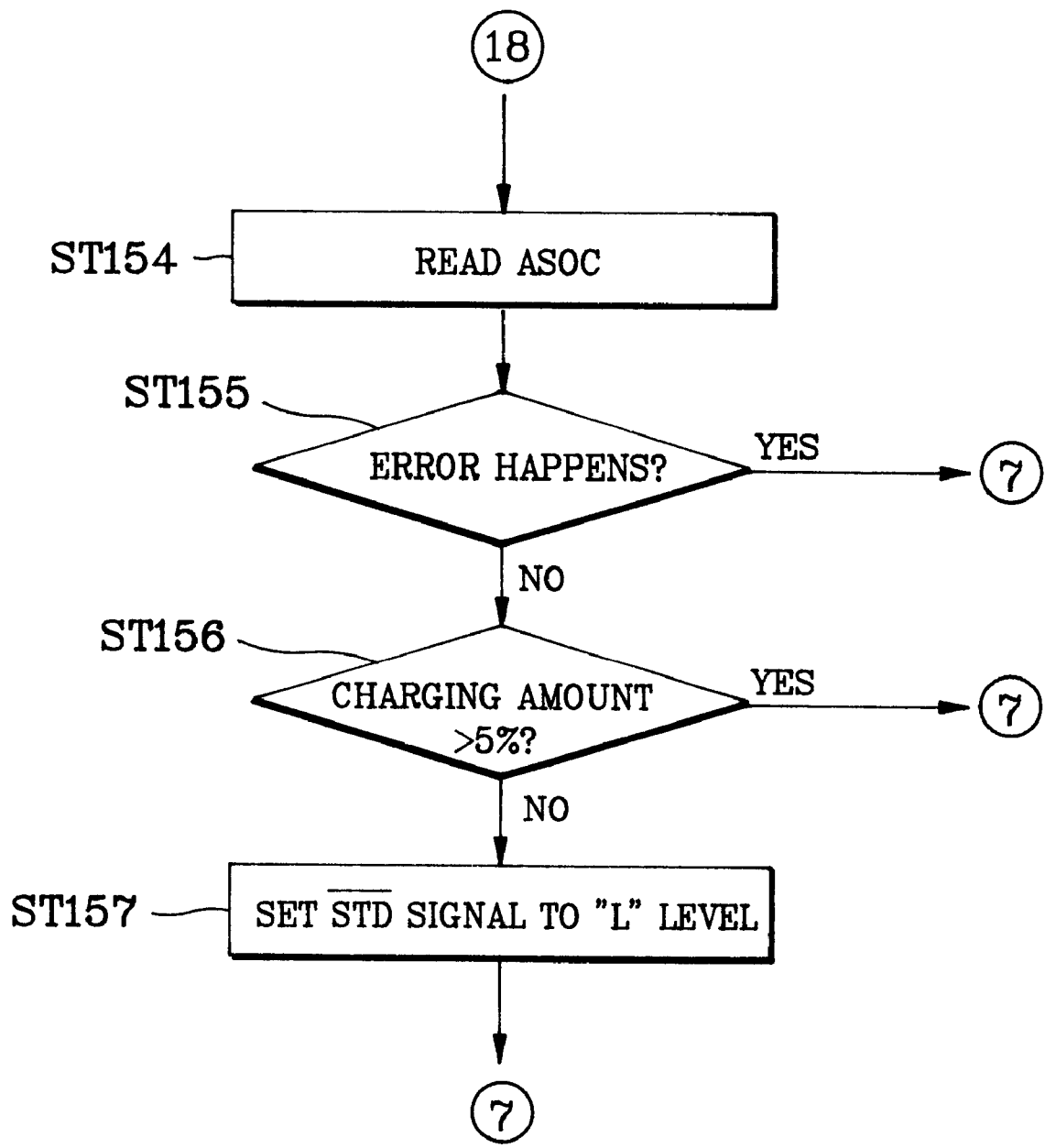
Figure 11N:
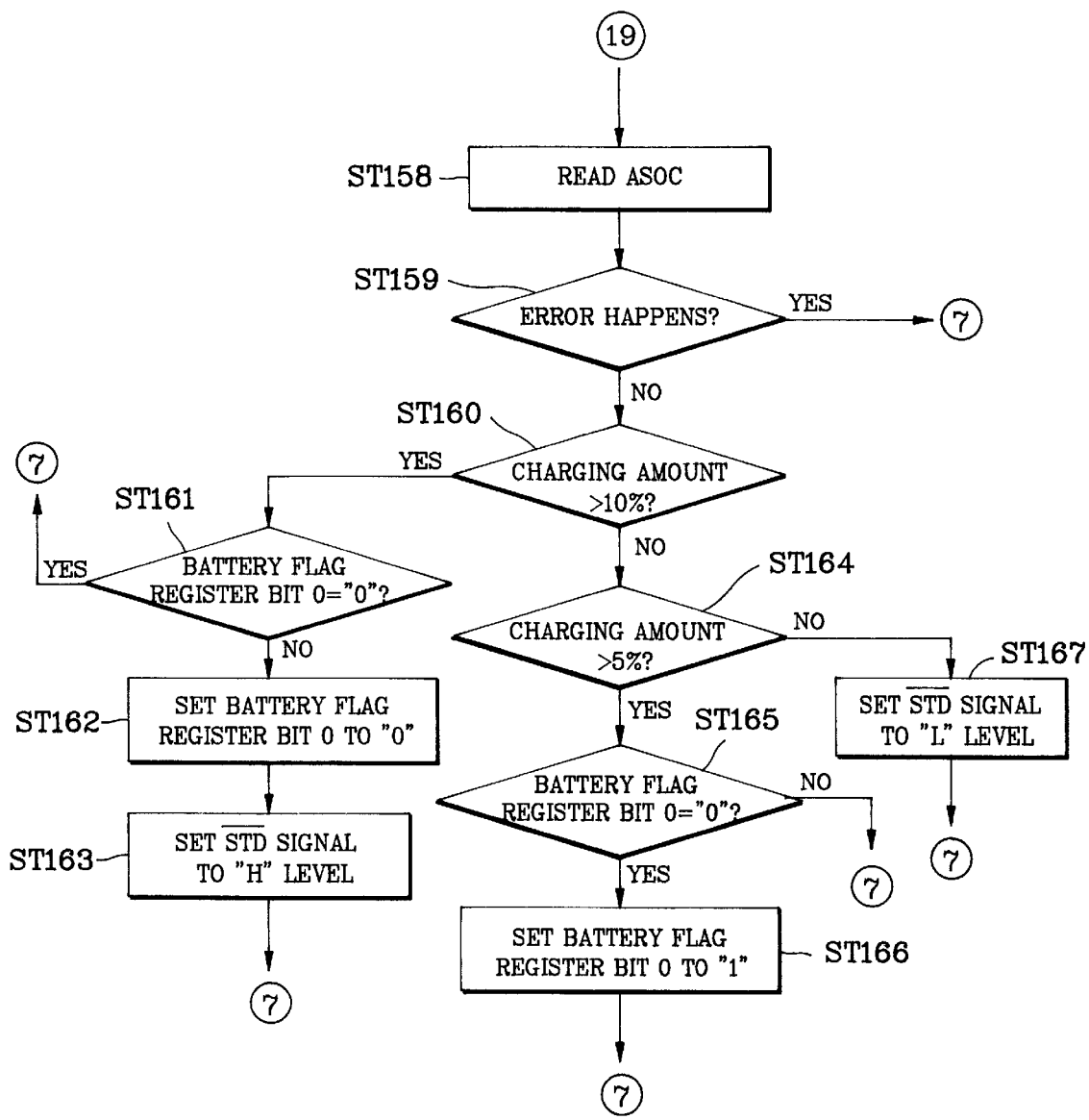

Accordingly, FIGS. 11a–11n are flowcharts for explaining the operations of the power supply system in consideration of the problems discussed above. A flowchart shown in FIG. 10 corresponds to a program, stored in ROM 90 in FIG. 8, which is executed by the keyboard controller 80. Besides, the keyboard controller 80 in FIG. 8 comprises a battery flag register for storing various status of the smart battery 70 and an internal memory for storing various control data.

FIG. 10 shows a bit configuration of the battery flag register of 8-bit data. Bit 0 and 1 of the battery flag register express the charge status of the smart battery 70, where the bit value "00" represents a battery normal status that the charge amount of the smart battery 70 is about 11 to 100%, the bit value "01" means a battery exhausted status that the charged amount is about 6 to 10%, and the bit value "10" denotes a battery dried-up status that the charge amount is less than or equal to 5%. Bit 2 expresses the charge status of the smart battery 70, where the bit value "1"represents that the smart battery 70 is not fully charged and the bit value "0" means that the smart battery 70 is fully charged. Bit 3 expresses the present operational status of the smart battery 70, where the bit value "1"represents a suspend mode and "0" means a normal mode. Bit 4 is not used. Bit 5 expresses the present charge status of the smart battery 70, where the bit value "1" represents that the charging is terminated and "0" denotes that the charging is in progress. Bit 6 expresses the types of smart batteries connected to the notebook computer, where the bit value "1"represents Li-ion smart battery and "0" means Ni-MH smart battery. Bit 7 expresses the present external power status, the bit value "1"represents that AC power is inputted from the power input port 121 of FIG. 8 and "0" means that AC power is not inputted.

Meanwhile, in the memory provided in the keyboard controller 80, various status data and control data, such as LiIon__Volt, that is, voltage regulating data of charging power $V_{CH}$ applied from the smart battery charger 60 to the smart battery 70, and APM__RSOC__STATUS for advanced power management of Windows 95. In fact, the LiIon__Volt corresponds to the data value for setting the charging voltage, supplied from the smart battery charger 60 to the smart battery 70, that is, the data value applied to the digital-to-analog converter 50, however, hereinafter, the value of LiIon__Volt will be defined as the charging voltage value supplied to the smart battery 70 so as to explain in brief.

Now flowcharts of FIGS. 11a–11n will be explained with reference to the operations of the power supply system shown in FIG. 8.

When the reset signal RESET is inputted to the keyboard controller 80 by switching the power switch SW of the power on-off signal input part 140, the keyboard controller 80 detects the on-off status of the notebook computer based on the signal level inputted to the second analog signal input port AIN1 (step 1, ST1).

At step 1, if the notebook computer is proved to be turned off as the output voltage V2 of the SMPS 130 is "L" level, that is, as "L" level signal is inputted to the second analog signal input port AIN1, then the keyboard controller 80 first controls the smart battery charger 60 to set the charging voltage and the charging current, supplied to the smart battery 70, to "0", thus initializing the smart battery charger 60 (ST2).

The keyboard controller 80 controls the smart battery charger 60 to set the charging voltage and the charging current to 11V and 300 mA respectively (ST3). In this manner, the system provides against a case that another battery, not a smart battery, is connected to the notebook computer, or a case that the smart battery 70 is set to the sleep mode. In particular, when the smart battery 70 is in the sleep mode as the charging power of the smart battery 70 is decreased less than a specified limit, the smart battery 70 cannot transmit and receive data through SM bus. Accordingly, since the charging operations for the smart battery 70 are not executed any more in this case, it is necessary to supply a predetermined charging power to the smart battery 70.

Meanwhile, after setting the charging power for the smart battery 70 to a predetermined reference value by controlling the smart battery charger 60 at step 3, the keyboard controller 80 sets all the bit values of battery flag register provided therein to "0", that is, the keyboard controller 80 initializes the battery flag register as 00h and sets the value of LiIon__Volt to a reference value of 11.5V (ST4). Then, after transmitting predetermined data to the smart battery 70 through SM bus, the keyboard controller 80 determines whether the smart battery 70 is connected to the notebook computer, based on an acknowledge signal received from the smart battery 70 (ST5). Here, if not, the keyboard controller 80 sets the LiIon_Volt of battery flag register and the memory to 0V, and controls the smart battery charger 60 to set the charging power for the smart battery 70 to the reference value, that is, the charging voltage to 11V and the charging current to 300 mA (ST6–ST7). The system proceeds to step 8 to delay for 3 seconds (ST8), and returns to step 5. Here, while delaying for 3 seconds at step 8, the keyboard controller 80 executes its ordinary operations, such as data input operation from a keyboard or a mouse, etc.

Meanwhile, at step 5, if the smart battery 70 is connected to the notebook computer, the keyboard controller 80 identifies whether the battery connected is Li-ion smart battery or Ni-MH smart battery, based on the battery identifying signals TS forwarded from the charge signal generator 110 to the first analog signal input port AIN0 (ST9). At this point, the decision is executed by determining whether the battery identifying signal TS is more than, or less than a predetermined level. Subsequently, at step 9, if the battery connected is identified as the Ni-MH smart battery, the keyboard controller 80 first reads the status of the smart battery 70 through SM bus and determines whether the smart battery 70 is fully charged (ST10–ST12). Here, the decision is executed by determining whether the bit of over charged alarm, bit of charge terminated or bit of fully charged alarm among the status data from the smart battery 70 has, for example, a bit value "1". Meanwhile, at step 11, if an error happens when reading the status of the smart battery 70, it returns to steps 5 and 6 so that the keyboard controller 80 sets the LiIon_Volt of the battery flag register and the memory to the reference value, and controls the smart battery charger 60 to set the charging power for the smart battery 70 to the reference value.

At step 12, if the smart battery 70 is fully charged, the keyboard controller 80 clears the bit 2 of battery flag register, shown in FIG. 10, to "0" (ST13), and controls the smart battery charger 60 to set the charging voltage to 15V and the charging current to 50 mA, thus executing trickle charge (ST14). Here, the reason predetermined charging voltage and charging current are supplied to the smart battery 70 fully charged is to maintain the smart battery 70 fully charged always, considering natural discharge of the smart battery 70.

At step 12, if the smart battery 70 is not fully charged, the keyboard controller 80 reads the bit 2 of battery flag register and determines if the corresponding bit is "0" (ST1S). If not, the system returns to step 5 by way of step 8. If so, it proceeds to step 17 in FIG. 11b to set the bit 2 of battery flag register to "1"(ST17). Subsequently, the system proceeds to increase the charging voltage for the smart battery 70 up to 15V, the charging current for the smart battery 70 up to 1800 mA gradually by controlling the smart battery charger 60 through step 17 to step 23 in due sequence (ST17–ST23), and returns to step 5 by way of step 8.

Figure 2A:
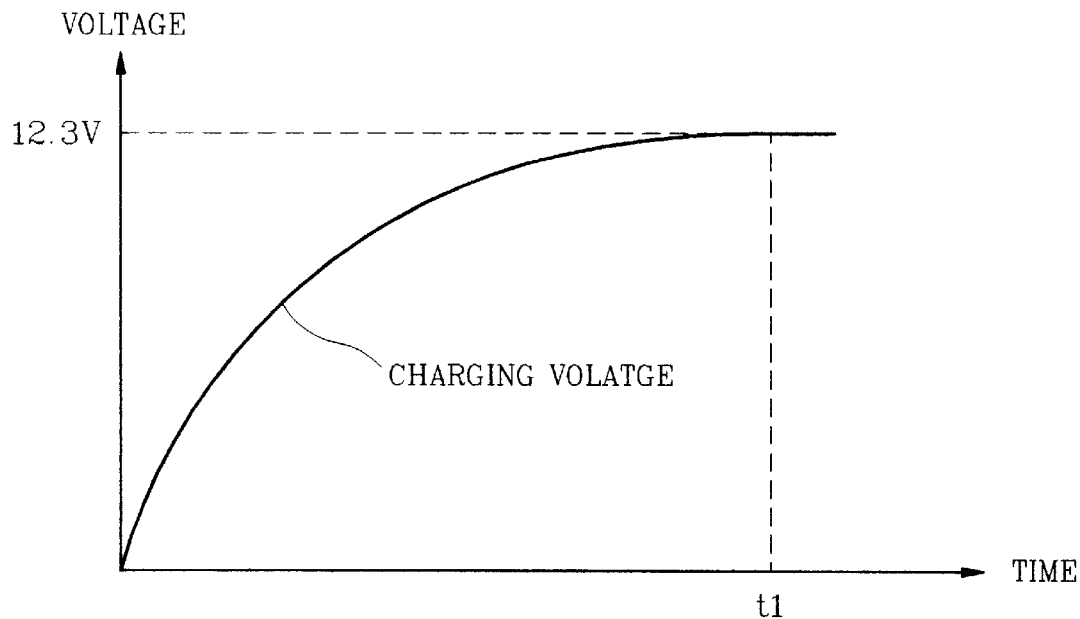
FIG. 2a and FIG. 2b are graphical representations charging characteristics of the smart battery.
Figure 2B:
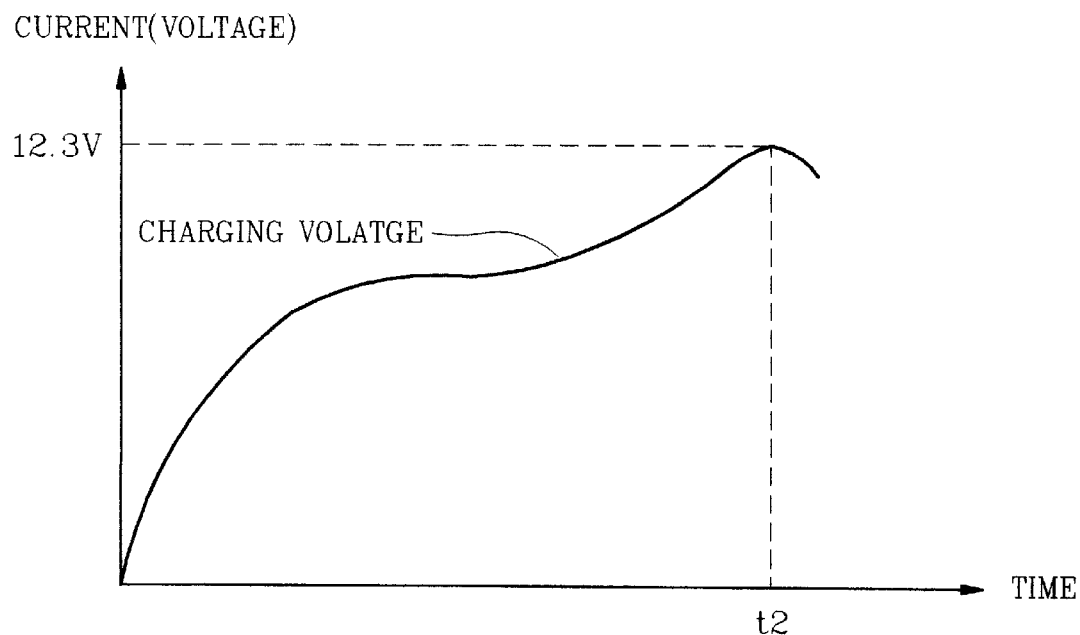

Accordingly, when the power switch of the notebook computer is turned off, the keyboard controller 80 first controls the smart battery charger 60 to supply charging power of 11V and 300 mA, thus preventing the smart battery 70 from being turned to the sleep mode. If the smart battery 70 is not connected, the keyboard controller 80 controls the smart battery charger 60 to supply charging power of liV and 300 mA as well. If the smart battery 70 is connected, the keyboard controller 80 identifies the types of smart batteries 70. If the smart battery 70 connected is identified as the Ni-MH smart battery, the keyboard controller 80 determines whether the smart battery 70 is fully charged. If so, the keyboard controller 80 controls the smart battery charger 60 to supply charging power of 15V and 50 mA, thus executing trickle charge. If not, the keyboard controller 80 controls the smart battery charger 60 to supply charging power of 15V and 1800 mA continuously till the smart battery 70 is fully charged, thus executing a constant current charging of 1800 mA described in FIG. 2b.

Meanwhile, at step 9, if the battery connected is the Li-ion smart battery, the keyboard controller 80 first reads the status of the smart battery 70 through SM bus and determines whether the smart battery 70 is fully charged, as shown in FIG. 11c (ST31–ST33). Here, the decision is executed by determining whether the bit of over charged alarm, bit of charge terminated alarm or bit of fully charged alarm among the status data read from the smart battery 70 have, for example, a bit value "1".

At step 33, if the smart battery 70 is fully charged, the keyboard controller 80 checks whether the bit of charge terminated alarm, read at step 31, is "1"(ST36). If so, the keyboard controller 80 clears the bit 5 of battery flag register to "1", the bit 2 to "0", and sets the value of LiIon_Volt to 11.5V (ST35). The keyboard controller 80 controls the smart battery charger 60 to set the charging voltage to 15V and the charging current to 600 mA, thus executing trickle charge (ST38). Meanwhile, at steps 33 and 36, if the smart battery 70 is not fully charged, and if the bit of charge terminated alarm is not "1", the keyboard controller 80 detects whether the bit 5 of battery flag register is "0" (ST39). If not, that is, if any other charging operations except trickle charge are not executed to the smart battery 70 that is not fully charged, the keyboard controller 80 controls the smart battery charger 60 to set the value of LiIon_Volt to 1800 mA as a charging current, thus executing a full-scale charging operation (ST40). The keyboard controller 80 sets the bit 5 of battery flag register to "0", thus representing that the charge for the smart battery 70 is in progress (ST41). At step 39, if the bit 5 of battery flag register is "0", that is, if the smart battery 70 is not fully charged, and if the charging operation for the smart battery 70 is in progress, the keyboard controller 80 reads, through SM bus, the current of the smart battery 70, that is, the current amount inputted and outputted through the positive port (+) of the smart battery 70 (ST42–ST43). Then, the keyboard controller 80 determines if the battery current, read at step 42, is greater than 1500 mA, for example (ST44). If so, the keyboard controller 80 maintains the charging voltage for the smart battery 70 LiIon_Volt, the charging current 1800 mA (ST45). If not, the keyboard controller 80 reads the voltage of the smart battery 70 through SM bus is (ST46–ST47).

In general, when charging a battery, the resistance value of the battery is gradually increased as time goes by and current amount supplied to the battery is decreased. Accordingly, as described above, when charging the smart battery 70 with the charging current of 1800 mA, the charging current is decreased less than 1500 mA after a given period of time. To prevent the problem described above, it is necessary to increase the charging voltage in the middle of charging for a sufficient charge.

At steps 46 and 47, when the voltage of the smart battery 70 is read out, the keyboard controller 80 checks if the voltage value is greater than 12.40V, or less than 12.14V (ST48 and ST51). At step 48, if the battery voltage is greater than 12.40V, the keyboard controller 80 stores a new value "LiIon_Volt–0.04V", subtracted 0.4V from the value of LiIon_Volt and sets the charging voltage for the smart battery 70 to a new value of "LiIon_Volt–0.04V" by controlling the smart battery charger 60 (ST49–ST50). At step 51, if the battery voltage is less than 12.15V, the keyboard controller 80 stores a new value "LiIon__Volt+ 0.04V", added 0.4V to the value of LiIon__Volt and sets the charging voltage for the smart battery 70 to a new value of "LiIon__Volt+0.04V" by controlling the smart battery charger 60 (ST52–ST53). That is, when the notebook computer is turned on and the Li-ion smart battery is connected the computer, the keyboard controller 80 determines if the smart battery 70 is fully charged, or if the bit of charge terminated alarm is detected from the smart battery 70. If so, the keyboard controller 80 controls the smart battery charger 60 to supply charging power of 11.5V and 600 mA to the smart battery 70, thus executing trickle charge. Meanwhile, if the smart battery 70 needs charge, the keyboard controller 80 controls the smart battery charger 60 to supply the value of LiIon__Volt, that is, the charging power of 11.5V and 1800 mA and then detects the current of the smart battery 70.

When the smart battery 70 is being charged in the manner described above, if the charging current supplied to the smart battery 70 is decreased less than 1500 mA as time goes by, the keyboard 80 boosts the charging voltage supplied to the smart battery 70 in the unit of 0.04V continuously up to the maximum 12.4V, thus controlling the charging operations securely. Accordingly, in the flowcharts described above, the initial charging voltage for the smart battery 70 is set to, for example 11.5V, considering that the hardware error rate of the smart battery charger 60 shown in FIG. 3 is about 5%. The keyboard controller 80 reads the current of the smart battery 70 and boosts the charging voltage gradually up to the maximum 12.4V, if necessary, thus controlling the charging operations of the LI-ion smart battery securely.

Meanwhile, at step 1 of FIG. 11a, when the notebook computer is proved to be turned on as "H" level signal is inputted to the second analog signal input port AIN1, according as the output voltage V2 of the SMPS 130 is "H" level in FIG. 8, the keyboard controller 80 first controls the smart battery charger 60 to set the charging power, supplied to the smart battery 70, to "0" (ST61), thus initializing the smart battery charger 60.

Then, the keyboard controller 80 sets the charging voltage to 11V and the charging current to 300 mA (ST62). Here, in this manner, the system provides against a case that another battery, not a smart battery, is connected to the notebook computer, or a case that the smart battery 70 is set to the sleep mode, as explained at step 3. The keyboard controller 80 sets all the bit values of battery flag register to "0", that is, initializes the battery flag register as 00h, and sets the value of LiIon__Volt to a reference value of 11.5V (ST63). Then, the keyboard controller 80 determines if the bit 3 of the battery flag register is "0" (ST64). If so, that is, if the notebook computer is in a normal operation mode, the keyboard controller 80 executes a keyboard scan operation (ST65) and sets the delaying time to, for example 3 seconds, by controlling an internal timer (ST66). At step 64, if the bit 3 of battery flag register is "1", that is, if the notebook computer is proved to be in a suspend mode, the delaying time is set to 0.5 second (ST67). Here, the delaying time set at steps 66 and 67 is for the keyboard scan operation at step 65. By the way, the reason the delaying time is set to be short, for example 0.5 second, is that the notebook computer is in the suspend mode, which means there is no key input for a predetermined time.

Then, the keyboard controller 80 transmits predetermined data to the smart battery 70 through SM bus, and determines whether the smart battery 70 is connected to the notebook computer, based on an acknowledge signal received from the smart battery 70 (ST68). If not, the keyboard controller 80 clears all the bits of the battery flag resistor but the bit 3 (ST69), and sets LiIon__Volt to 11.5V (ST70). Besides, the keyboard controller 80 sets the charging power for the smart battery 70 to 0V and 0 mA by controlling the smart battery charger 60 (ST71), which means the charging operations for the smart battery 70 is shut down.

At step 68, if the smart battery 70 is proved to be connected, the keyboard controller 80 identifies whether the battery connected to the notebook computer is Li-ion smart battery or Ni-MH smart battery, based on the battery identifying signals TS applied to the first analog signal input port AIN0 (ST72). At step 72, if the battery is identified as the Ni-MH smart battery, the keyboard controller 80 first reads the current of the smart battery 70 through SM bus and determines whether AC power is inputted to the notebook computer through the adaptor 121 shown in FIG. 8 (ST73–ST75). Here, the current of the smart battery 70 is decided as the value difference between the discharging current amount outputted from the smart battery 70 and the charging current amount supplied to the smart battery 70. Accordingly, when the charging current is not supplied from the smart battery charger 60 to the smart battery 70 according as an external power is not inputted, the current value read from the smart battery 70 has, for example a value "1111XXXX", that is, the upper 4-bit is set to "1111". At step 75, whether AC power is inputted or not is decided based on the data value of the upper bit. At step 74, if an error happens when reading data of the smart battery 70, the keyboard controller 80 clears all the bits of battery flag register but the bits 0 and 3 (ST76) to "0", and sets the charging power for the smart battery 70 to 11V and 300 mA by controlling the smart battery charger 60 (ST77). Then, at step 75, if the AC power is connected, the keyboard controller 80 clears the bit 6 of battery flag register to "0" and stores that the Ni-MH smart battery is connected at present (ST78).

Meanwhile, at step 72, if the battery is identified as the Li-ion smart battery, the keyboard controller 80 sets the bit 6 of battery flag register to "1"(ST79), Then, it determines whether AC power is inputted to the notebook computer through the adaptor 121 by reading the current of the smart battery 70 through SM bus, as same as steps 73 and 74 (ST80–ST82). At step 81, if an error happens when reading data of the smart battery 70, it proceeds to step 84 below.

After clearing the bit 6 of battery flag register at step 78, or if the AC power is inputted at step 82, the keyboard controller 80 sets bit 7 of APM__RSOC__STATUS to "1" (ST83). Here, the APM__RSOC__STATUS data is constructed with 8-bit, of which bit 0 to bit 6 store relative-state-of-charge data RSOC read from the smart battery 70, and bit 7 stores "1"when AC power is inputted and "0" when AC power is not inputted. At step 84, the keyboard controller 80 determines whether the bit 2 of battery flag register is "0" or "1", that is, if the smart battery 70, in its present state, is fully charged or not fully charged (ST84). If the smart battery 70 is fully charged, the keyboard controller 80 identifies whether the battery connected to the notebook computer is Ni-MH smart battery, that is, if the bit 6 of battery flag register is "0" (ST85). If so, the keyboard controller 80 controls the smart battery charger 60 to supply charging power of 15V and 50 mA to the smart battery 70 (ST86), thus executing trickle charge. If the battery identified as the Li-ion smart battery, that is, if the bit 6 of battery flag register is "1", the keyboard controller 80 sets the value of LiIon__Volt to 11.5V (ST87), and controls the smart battery charger 60 to set the charging voltage to LiIon__Volt and the charging current to 50 mA, thus executing trickle charge (ST88).

At step 84, if the smart battery 70 is not fully charged, the keyboard controller 80 identifies whether the battery connected to the notebook computer is Ni-MH smart battery, 15s that is, if the bit 6 of battery flag register is "0" (ST85). If so, the keyboard controller 80 controls the smart battery charger 60 to supply charging power of 14 V and 600 mA to the smart battery 70 (ST90). If the smart battery 70 is identified as the Li-ion smart battery, that is, if the bit 6 of battery flag register is "1", the keyboard controller 80 controls the smart battery charger 60 to supply charging power of LiIon__Volt and 600 mA to the smart battery 70 (ST91).

At steps 86, 88, 90 and 91, predetermined charging powers are supplied to the smart battery 70. Then, the keyboard controller 80 reads RSOC data from the smart battery 70 through SM bus (ST92–ST93) and stores the read data as APM_RSOC_STATUS (ST94). Repeatedly, the keyboard controller 80 reads the status of smart battery 70 through SM bus (ST95–ST96) and identifies the types of smart batteries connected to the notebook computer at preset, referring to the bit 6 of battery flag register (ST97). At step 97, if the bit 6 of battery flag register is "1", that is, if the battery connected is identified as the Li-ion smart battery, the keyboard controller 80 determines whether the smart battery 70 is fully charged, based on the status data read at step 95 (ST98). Here, the decision is executed by determining whether the bit of over charged alarm, bit of charge terminated alarm or bit of fully charged alarm among the status data read from the smart battery 70 has, for example a bit value "1", as same as step 33 in FIG. 11c. If the smart battery 70 is not fully charged, the keyboard controller 80 determines whether the bit of charge terminated alarm is "1"(ST99). If not, it proceeds to step 109 described hereinafter. If so, the keyboard controller 80 sets the bit 5 of battery flag register to "1" (ST100).

At step 98, if the smart battery 70 is proved to be fully charged, or if the bit of charge terminated alarm is "1"and the bit 5 of battery flag register is set to "1"at steps 99 and 100, the keyboard controller 80 determines if the bit 2 of battery flag register is "0" (ST101). If not, the keyboard controller 80 clears the bit to "0" (ST102) and sets LiIon_ Volt of the memory to 11.5V (ST103). Then, the keyboard controller 80 controls the smart battery charger 60 to set the charging power for the smart battery 70 to LiIon-Volt and 600 mA (ST104). Meanwhile, at step 97, if the bit 6 of battery flag register is "0", that is, if the battery is identified as the Ni-MH smart battery, the keyboard controller 80 determines whether the smart battery 70 is fully charged, based on the status data read at step 95 (ST105). Here, the decision is executed by determining whether the bit of over charged alarm, bit of charge terminated alarm or bit of fully charged alarm among the status data read from the smart battery 70 has, for example a bit value "1", as same as step 12 in FIG. 11a. At step 105, if the smart battery 70 is proved to be fully charged, the keyboard controller 80 determines if the bit 2 of battery flag register is "0" (ST109). If so, that is, if the smart battery 70 is not fully charged and the bit 2 of battery flag register is set to "0", the keyboard controller sets the bit 2 of battery flag register to "1"(ST110). Then, the keyboard controller 80 determines whether the bit 6 of battery flag register is "0" (ST111). If so, that is, if the battery is identified as the Ni-MH smart battery, the keyboard controller 80 controls the smart battery charger 60 to supply charging power of 15V and 600 mA to the smart battery 70 (ST112). If not, that is, if the battery is proved to be the Li-ion smart battery, the keyboard controller 80 controls the smart battery charger 60 to supply charging power of LiIon__Volt and 600 mA (ST113).

At step 109, if the bit 2 of battery flag register is not "0", that is, if the smart battery 70 is not fully charged, is the keyboard controller 80 executes charging operations for the Li-ion smart battery. In FIG. 11j, the keyboard controller 80 determines again whether the bit 6 of battery flag register is "0" (ST121). If not, that is, if the battery is Ni-MH smart battery, the keyboard controller 80 checks if the bit 5 of battery flag register is "0" (ST122). If not, that is, if the charger for the smart battery 70 is terminated, the keyboard controller 80 clears the bit 5 to "0" (ST123) and controls the smart battery charger 60 to supply charging power of LiIon__Volt and 600 mA (ST124). At step 122, if the bit 5 of battery flag register is "0", the keyboard controller 80 executes the charging operations for Li-ion smart battery in the same manner described at step 42 to step 53. As described above, the keyboard controller 80 reads, through SM bus, the current of the smart battery 70, that is, the current amount inputted and outputted through the positive port (+) of the smart battery 70 (ST125–ST126), then, determines if the battery current, read at step 125, is greater than 500 mA (ST127). If so, the keyboard controller 80 maintains the charging voltage for the smart battery 70 LiIon__Volt, the charging current 600 mA (ST128). If not, the keyboard controller 80 reads the voltage of the smart battery 70 through SM bus (ST129–ST130), and determines whether the voltage of the smart battery 70 is greater than 12.40V, or less than 12.15V (ST131–134). At step 131, if the battery voltage is greater than 12.40V, the keyboard controller 80 stores a new value "LiIon__Volt−0.04V", subtracted 0.4V from the value of LiIon__Volt, in the memory, and sets the charging voltage for the smart battery 70 to new value of "LiIon__Volt−0.04V" by controlling the smart battery charger 60 (ST132–ST133). At step 134, if the battery voltage is less than 12.15V, the keyboard controller 80 stores a new value "LiIon__Volt+0.04V", added 0.4V to System Management the value of LiIon __Volt, in the memory, and sets the charging voltage for the smart battery 70 to a new value of "LiIon__Volt+0.04V" by controlling the smart battery charger 60 (ST135–ST136).

As described above, when the power switch of the notebook computer is turned on, the keyboard controller 80 first controls the smart battery charger 60 to supply charging power of 11V and 300 mA, thus preventing the smart battery 70 from being turned to the sleep mode. After determining whether the notebook computer is in a suspend mode, the keyboard controller 80 sets the delaying time for a keyboard scan, etc., to a predetermined value according to the decision. Then, the keyboard controller 80 detects whether the smart battery 70 is connected to the notebook computer. If not, charging power of 0V and 0 mA is supplied. If so, the keyboard controller 80 determines whether AC power is inputted. If so, the keyboard controller 80 determines whether the smart battery 70 if fully charged. If so, the keyboard controller 80 identifies whether the battery connected to the notebook computer is Ni-MH smart battery or Li-ion smart battery, then, controls the smart battery charger 60 to supply charging power of 15V and 50 mA in case of Ni-MH smart battery, 11.5V and 600 mA in case of Li-ion smart battery. Meanwhile, if the smart battery 70 is not fully charged, the keyboard controller 80 identifies whether the battery connected to the notebook computer is Ni-MH smart battery or Li-ion smart battery, then, controls the smart battery charger 60 to supply charging power of 15V and 600 mA in case of Ni-MH smart battery, Li-Ion-Volt of 11.5V and 600 mA in case of Li-ion smart battery. Subsequently, the keyboard controller 80 detects the current amount of the smart battery 70, and in case that the charging current supplied to the smart battery 70 is decreased less than 500 mA as the charging time goes by, the keyboard controller boosts the charging voltage supplied to the smart battery 70 in the unit of 0.04V continuously within the range of not exceeding 12.4V, thus controlling the charging operations securely.

Meanwhile, at steps 75 and 82, if AC power is not inputted, that is, if a user turns on the power switch when an external power source is not connected, the keyboard controller 80 executes various data process for secure operations of notebook computer based on power status of the smart battery 70.

In FIG. 11, the keyboard controller 80 determines whether the smart battery 70 connected to the notebook computer is fully charged or not, referring to the bit 2 of battery flag register (ST140). If the smart battery 70 is not fully charged, the keyboard controller 80 identifies the types of smart batteries 70, referring to the bit 6 of battery flag register (ST141). Then, the keyboard controller 80 controls the smart battery charger 60 to supply charging power of LiIon__Volt and 600 mA to the smart battery 70 in case of the Li-ion smart battery (ST142), and charging power of 15V and 600 mA in case of the Ni-MH smart battery (ST143). At step 140, if the smart battery 70 is fully charged, the keyboard controller 80 identifies the types of smart batteries 70, referring to the bit 6 of battery flag register (ST144). Then, the keyboard controller 80 controls the smart battery charger 60 to supply charging power of 15V and 50 mA to the smart battery 70 in case of the Ni-MH smart battery (ST145). If the battery is identified as the Li-ion smart battery, the keyboard controller 80 sets the value of LiIon__Volt to 11.5V (ST146) and controls the smart battery charger 60 to supply charging power of LiIon__Volt and 600 mA to the smart battery 70 (ST147).

Here, when an external power source is not connected to the notebook computer, as described in FIG. 8, the smart battery charger 60 is set to a non-operational status according as the first power voltage V1 is not outputted from the power input part 120. Nevertheless, the reason the keyboard controller 80 controls the smart battery charger 60 to set the charging voltage to a predetermined value, that is, a reference value, is to provide against a case that the system returns to the step 140 due to an error of the system when an external power is inputted, or a case that the external power is inputted in a sudden when the user uses the notebook computer. That is, at steps 140 to 147, the system can provide for an abnormal operation by resetting the smart battery charger 60 to supply the minimum charging power to the smart battery 70 according to the charge status and the type of the smart battery 70.

Subsequently, at step 148, the keyboard controller 80 sets the value of LiIon__Volt to 11.5V (ST148) and clears the bit 7 of APM__RSOC__STATUS to "0" (ST149). Then, the keyboard controller reads RSOC from the smart battery 70 and stores the value of read data to the bit 0 to bit 6 of APM__RSOC__STATUS (ST150–ST152). Then, keyboard controller 80 determines whether the bit 3 of battery flag is "0", that is, if the notebook computer is in a normal mode (ST153). If not, as shown in FIG. 11, the keyboard controller 80 reads an Absolute State Of Charge ASOC from the smart battery 70 (ST154–ST155), and detects whether the charge amount of the smart battery 70 is greater than 5% (ST156). If not, the keyboard controller 80 sets a save-to-disk signal $\overline{STD}$ to "L" level (ST157). Here, as the STD signal $\overline{STD}$ is applied to a core chip, the computer system executes the STD function, that is, saves working data to a hard disk. At step 153, if the notebook computer is in a normal mode, as shown in FIG. 11n, the keyboard controller 80 reads the ASOC from the smart battery 70 through SM bus (ST158–ST159), and determines whether the charge amount of the smart battery 70 is greater than 10% (ST160). If so, the keyboard controller 80 clears the bit 0 of battery flag register to "0" and sets the STD signal $\overline{STD}$ to "H" level (ST161–ST163). At steps 160 and 164, if the charge amount of the smart battery 70 is less than or equal to 10%, and greater than 5%, the keyboard controller 80 sets the bit 0 of battery flag register to "1"(ST165–ST166). Here, at step 160, if a green light emitted diode LED and a red LED are mounted to the keyboard controller 80 in FIG. 10, the LEDs may indicate the charge status for the smart battery 70, in a manner that the green LED lights up when the charge amount of the smart battery 70 is greater than 10%, and the red LED when the charge amount of the smart battery 70 is less than or equal to 10%. Subsequently, when the notebook computer operates with the charging power of smart battery 70, without the external power, the keyboard controller 80 shuts down the charging operations for the smart battery 70 and detects the charge amount of the smart battery 70 for secure operations of notebook computer. Then, if the charge amount of smart battery 70 is decreased to a predetermined value, for example less than or equal to 5%, the keyboard controller 80 sets the STD signal $\overline{STD}$ to "L" level, thus preventing damage to working data due to a decrease of smart battery 70 charge amount. Meanwhile, if the external power is inputted normally, the keyboard controller 80 prevents an over charging power from being supplied to the smart battery 70 due to a sudden input of the external power, by setting the charging power outputted from the smart battery charger 60 to a reference value.

As described in detail above, according to the present invention, it is possible to control the charging voltage and the charging current supplied to the smart battery, selectively, based on the first and second power voltages outputted from the analog-to-digital converter. The first and second power voltages outputted from the analog-to-digital converter can be controlled through the SM bus. Accordingly, it is possible to execute appropriate charging operations according to the types of smart batteries.

Besides, according to the present invention, since software methods provided in the system can compensate for the hardware errors of the smart battery charger, the charging operations for the smart battery can be executed precisely, which facilitates the design of the hardware as well.

Furthermore, according to the present invention, it is possible to sense the over charged status of the smart battery based on voltage levels of the resistance sensing port provided in the smart battery. With these signals, the system shuts down the charging operations of the smart battery directly, thus enhancing the safety in charging operations of the smart battery.

Moreover, the power supply system, in accordance with the present invention, sets the charging power for the smart battery appropriately according to the on-off status of the notebook computer, and outputs a save-to-disk signal STD based on the charge amount of the smart battery and the connection status of the external power, thus enhancing the security in operations of the notebook computer.

In addition, since an operational power is supplied constantly to the keyboard controller for controlling the smart battery charging system, regardless of the on-off status of notebook computer, it is possible to execute the charging operations for the smart battery securely.

It will be apparent to those skilled in the art that various modifications and variations can be made in a smart battery charger and a power supply system for portable computer of the present invention without deviating from the spirit or scope of the invention. Thus, it is intended that the present invention cover the modifications and variations of this invention provided they come within the scope of the appended claims and their equivalents.

What is claimed is:

1. A smart battery charger, for supplying predetermined charging power to a smart battery that includes a positive port (+), a resistance sensing port T, a System Management SM bus data port D, a System Management SM bus clock port C and a negative port (−), and outputs various data, such as over charged alarm, charge terminated alarm, over temperature alarm, fully charged alarm and fully discharged alarm through the SM bus data port T and SM bus clock port C, comprising:

a switching mode power supply SMPS for generating predetermined operational power based on first predetermined power voltage and keeping power voltage, inputted from a feedback port provided therein, constant;

a current detecting means for receiving the operational is power outputted from the SMPS and outputting current corresponding to current amount outputted through a predetermined detected current output port provided therein; and a digital-to-analog converting means, connected to the SM bus, including first and second voltage output ports for outputting first and second power signals corresponding to data inputted through the SM bus, the output current of the current detecting means is coupled to a charging power output port, first and second resistors are serially connected between the charging power output port and a ground, and nodes, formed therebetween, are linked to the feedback port of the SMPS through a line, the first voltage output port of the digital-to-analog converting means is connected to the line through a third resistor, the detected current output port of the current detecting means is coupled to the line through a first diode and to the second voltage output port of the digital-to-analog converting means through a second diode and a fourth resistor.

2. The smart battery charger as recited in claim 1, wherein the detected current output port of the current detecting means is connected to predetermined power voltage to prevent over-current from being flowing therethrough.

3. A charge signal generator, for supplying predetermined charging power to a smart battery that includes a positive port (+), a resistance sensing port T, a System Management SM bus data port D, a System Management SM bus clock port C and a negative port (−), and outputs, through the SM bus data port T and SM bus clock port C, various data, such as over charged alarm, charge terminated alarm, over temperature alarm, fully charged alarm and fully discharged alarm, comprising:

a first resistor connected between the resistance sensing port and first power voltage;

a first comparing means, of which a non-inverting terminal is connected to voltage level of the resistance sensing port and an inverting terminal is connected to first predetermined reference voltage; and a second comparing means, of which a non-inverting terminal is connected to voltage level of the resistance sensing port, an inverting terminal is connected to second predetermined reference voltage and an output terminal is connected to the inverting terminal of the first comparing means, the output signals of the first comparing means are outputted as charge signals.

4. A smart battery charging system, for supplying predetermined charging power to a smart battery that includes a positive port (+), a resistance sensing port T, a System Management SM bus data port D, a System Management SM bus clock port C and a negative port (−), and outputs various data, such as over charged alarm, charge terminated alarm, over temperature alarm, fully charged alarm and fully discharged alarm through the SM bus data port T and SM bus clock port C, comprising:

a battery charging means, including a charging power output port connected to the positive port of the smart battery, for varying voltage level and current level of charging power, ouputted through the charging power output port, based on data inputted through the SM bus;

a charge signal generating means, connected to the resistance sensing port of the smart battery, for generating predetermined charge signals and battery identifying signals based on resistance values of the smart batteries connected to the resistance sensing port; and a keyboard controller, connected to the battery charging means and the smart battery through the SM bus, for controlling the battery charging means by identifying the types of smart batteries based on the battery identifying signals obtained from the charge signal generating means, the battery charging means executes the battery charging operations based on the charge signals obtained from the charge signal generating means.

5. The smart battery charging system as recited in claim 4, wherein the charge signal generating means comprising:

a first resistor connected between the resistance sensing s port and first power voltage;

a first comparing means, of which a non-inverting terminal is connected to voltage level of the resistance sensing port and an inverting terminal is coupled to first predetermined reference voltage; and a second comparing means, of which a non-inverting terminal is connected to voltage level of the resistance sensing port, an inverting terminal is connected to second predetermined reference voltage and an output terminal is coupled to the inverting terminal of the first comparing means, the output signals of the first comparing means are outputted as charge signals, the voltage levels of a node between the resistance sensing port and the first power voltage are outputted as battery identifying signals.

6. A Li-ion smart battery charging method, for charging a Li-ion smart battery that includes a positive port (+), a resistance sensing port T, a System Management SM bus data port D, a System Management SM bus clock port C and a negative port (−), and outputs various data, such as over charged alarm, charge terminated alarm, over temperature alarm, fully charged alarm and fully discharged alarm through SM bus data port T and SM bus clock port C, comprising:

a battery charging step of supplying the smart battery with first charging power having first voltage value and first current value;

a current value reading step of reading the current value of the smart battery; and a charging voltage control step of boosting charging voltage in stages to the maximum voltage that the smart battery allows, in case that the battery current value read from the current value reading step is less than second current value, the second current value is set to be less than the first current value.

7. The Li-ion smart battery charging method as recited in claim 6, further including a step of supplying the smart battery with second charging power that is less than the first charging power.

8. A power including a smart battery that has a positive port (+), a resistance sensing port T, a System Management SM bus data port D, a System Management SM bus clock port C and a negative port (−), and outputs various data, such as over charged alarm, charge terminated alarm, over temperature alarm, fully charged alarm and fully discharged alarm through SM bus data port T and SM bus clock port C, the notebook computer charges the smart battery in case that an external power source is connected thereinto, and utilizes the charging power of the smart battery as an operational power in case that no external power source is connected thereinto, the system comprising:

a power input means, connected to the external power source and a positive port of the smart battery, for outputting external power or smart battery power selectively based on the connection status of external power source and outputting the external power as first power voltage;

a power on-off signal input means through which a user turns on and off the notebook computer;

a switching mode power supply SMPS for outputting second power voltage for operating the notebook computer based on the operational power obtained from the power input means when the notebook computer is turned on, and outputting a first level of power good signal when power is on and a second level of power good signal when power is off;

a constant voltage regulating means for generating third power, based on the second power voltage when the power good signal is the first level, and based on the first power voltage when the power good signal is the second level;

a battery charging means, that utilizes the first power voltage as an operational power and includes a charging power output port connected to the positive port of the smart battery, for varying voltage level and current level of the charging power, ouputted through the charging power output port, according to data inputted through an SM bus; and a keyboard controller, that utilizes the third power voltage as an operational power and connects to the battery charging means and the smart battery through the SM bus, for controlling the smart battery charging means by identifying the type of smart battery based on battery identifying signals obtained from a charge signal generating means.

9. The power supply system for a notebook computer as recited in claim 8, further including a charge signal generating means, coupled to the resistance sensing port of the smart battery, for generating predetermined charge signals and battery identifying signals based on resistance values of the smart batteries connected to the resistance sensing port, the battery charging means executes the battery charging operations based on the charge signals obtained from the charge signal generating means.

10. The power supply system for a notebook computer as recited in claim 9, wherein the battery identifying signals are coupled to a first analog signal input port of the keyboard controller, the keyboard controller identifies the type of smart battery based on the level of the battery identifying signals.

11. The power supply system for a notebook computer as recited in claim 10, wherein the keyboard controller executes a constant voltage charging for a Li-ion smart battery and a constant current charging for a Ni-MH smart battery.

12. The power supply system for a notebook computer as recited in claim 8, wherein the second power voltage is coupled to a second analog signal input port of the keyboard controller, the keyboard controller determines the on-off status of the notebook computer based on the level of the second power voltage.

13. The power supply system for a notebook computer as recited in claim 12, wherein the keyboard controller sets the charging voltage and the charging current for the smart battery diversely according to the power on-off status of the notebook computer.

14. The power supply system for a notebook computer as recited in claim 8, wherein the keyboard controller reads the current of the smart battery through the SM bus and determines the connection status of the external output source.

15. The power supply system for a notebook computer as recited in claim 14, wherein the keyboard controller controls the battery charging means to set the charging power for the smart battery to a predetermined value, even though no external power source is connected thereinto.

16. The power supply system for a notebook computer as recited in claim 8, wherein the keyboard controller includes an internal memory for storing battery status data of the smart battery, the data stored in the memory can be read through an address bus and a data bus.

17. The power supply system for a notebook computer as recited in claim 8, wherein the constant voltage regulating means including:

a regulator for receiving the first power voltage and outputting predetermined power voltage;

a first channel FET of which a current passage is coupled between output ports of the regulator and an output port of the third power voltage; and a second channel FET of which a current passage is connected between output ports of the second and third power voltages, gates of the first and second channel FETs are coupled to the first power voltage, a current passage of a first channel transistor, turned on or turned off according to the level of the power good signal, is connected between the gates of the first and second channel FETs and a ground.

18. The power supply system for a notebook computer as recited in claim 8, wherein the keyboard controller first controls the battery charging means to supply first charging power of first charging voltage and first charging current, every time when the notebook computer is turned on and turned off.

19. The power supply system for a notebook computer as recited in claim 8, wherein the keyboard controller transmits predetermined data to the smart battery through the SM bus, then determines whether or not the smart battery is connected to the notebook computer based on an acknowledge signal received from the smart battery.

20. The power supply system for a notebook computer as recited in claim 19, wherein the keyboard controller sets the charging power outputted from the battery charging means to a predetermined value, if a smart battery is proved not to be connected to the notebook computer when the power switch is off.

21. The power supply system for a notebook computer as recited in claim 8, wherein the keyboard controller controls the battery charging means to execute a trickle charge if the external power source is connected to the notebook computer and the smart battery is fully charged.

22. The power supply system for a notebook computer as recited in claim 8, wherein the keyboard controller sets an operation time for inputting keyboard scan data to predetermined values, respectively, by determining whether the notebook computer is in a suspend mode or in a normal mode when the power is on.

23. The power supply system for a notebook computer as recited in claim 8, wherein the keyboard controller reads a value of an Absolute State Of Charge ASOC from the smart battery through the SM bus if an external power source is not connected and the notebook computer is turned on, and outputs a save-to-disk signal STD if the value of the ASOC is less than a predetermined value.

* * * * *